(12) United States Patent
Takahashi

(10) Patent No.: US 10,311,417 B2
(45) Date of Patent: Jun. 4, 2019

(54) SALES DATA PROCESSING APPARATUS AND METHOD FOR INSTRUCTING OPERATION ON OPERATION SECTION TO BE OPERATED NEXT

(71) Applicant: TOSHIBA TEC KABUSHIKI KAISHA, Shinagawa-ku, Tokyo (JP)

(72) Inventor: Nobuyuki Takahashi, Kannami Tagata Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 336 days.

(21) Appl. No.: 15/210,004

(22) Filed: Jul. 14, 2016

(65) Prior Publication Data

US 2017/0017941 A1     Jan. 19, 2017

(30) Foreign Application Priority Data

Jul. 15, 2015    (JP) ................................. 2015-141027

(51) Int. Cl.
| | | |
|---|---|---|
| *G06Q 20/20* | (2012.01) | |
| *G06Q 20/18* | (2012.01) | |
| *G07G 1/12* | (2006.01) | |

(52) U.S. Cl.
CPC ............ *G06Q 20/18* (2013.01); *G06Q 20/20* (2013.01); *G07G 1/12* (2013.01)

(58) Field of Classification Search
CPC ..................................................... G06F 3/048
USPC ......................................................... 705/16
See application file for complete search history.

(56) References Cited

FOREIGN PATENT DOCUMENTS

| JP | 2009-187443 | 8/2009 | |
|---|---|---|---|
| JP | 2014-109916 | 6/2014 | |
| JP | 2014-109916 A | * 12/2014 | ............ G06F 3/048 |

OTHER PUBLICATIONS

Reasons for Refusal of Japanese Application No. 2015-141027, dated Nov. 17, 2017 (Year: 2017).*
Japanese Office Action for Japanese Patent Application No. 2015-141027 dated Nov. 21, 2017.

* cited by examiner

*Primary Examiner* — Russell S Glass
(74) *Attorney, Agent, or Firm* — Amin, Turocy & Watson LLP

(57) ABSTRACT

A sales data processing apparatus comprises a position storage section which stores a position of an operation section operated by an operator, a line of sight measurement device which measures a position of line of sight of the operator, a line of sight position storage module which stores the position of the line of sight measured by the line of sight measurement device, a coincidence determining module which determines whether or not the position of an operation section to be operated next by the operator is coincident with the position of the line of sight of the operator stored, and an operation informing module which informs information for instructing an operation of the operation section if the coincidence determining module determines that the position of the operation section to be operated next is not coincident with the position of the line of sight of the operator stored.

6 Claims, 16 Drawing Sheets

FIG.5

| | |
|---|---|
| ANNOUNCEMENT FLAG A SECTION | — 3331 |
| ANNOUNCEMENT FLAG B SECTION | — 3332 |
| ANNOUNCEMENT FLAG C SECTION | — 3333 |
| ANNOUNCEMENT FLAG D SECTION | — 3334 |
| ANNOUNCEMENT FLAG E SECTION | — 3335 |
| ANNOUNCEMENT FLAG F SECTION | — 3336 |
| ANNOUNCEMENT FLAG G SECTION | — 3337 |
| ANNOUNCEMENT FLAG H SECTION | — 3338 |

| | |
|---|---|
| START KEY | XsYs |
| READING SECTION | Xm0Yn0 |
| CLOSING KEY | Xm1Yn1 |
| CASH SETTLEMENT KEY | Xm2Yn2 |
| CARD SETTLEMENT KEY | Xm3Yn3 |
| BILL DEPOSITING PORT | Xm4Yn4 |
| COIN DEPOSITING PORT | Xm5Yn5 |
| BILL DISPENSING PORT | Xm6Yn6 |
| COIN DISPENSING PORT | Xm7Yn7 |
| RECEIPT ISSUING PORT | Xm8Yn8 |
| CARD INSERTION PORT | Xm9Yn9 |

SALES DATA PROCESSING APPARATUS AND METHOD FOR INSTRUCTING OPERATION ON OPERATION SECTION TO BE OPERATED NEXT

CROSS-REFERENCE TO RELATED APPLICATION

This application is based upon and claims the benefit of priority from Japanese Patent Application No. 2015-141027, filed Jul. 15, 2015, the entire contents of which are incorporated herein by reference.

FIELD

Embodiments described herein relate generally to a sales data processing apparatus and a method for instructing an operation on an operation section to be operated next by an operator.

BACKGROUND

In recent years, in a store such as a large retail store or a convenience store, there is a self-checkout sales data processing apparatus with which a customer carries out a sales registration operation and a settlement operation by himself or herself.

The self-checkout sales data processing apparatus, e.g., self-checkout POS terminal (self POS), is convenient in a case in which a small quantity of commodities are purchased, because the transaction time of the commodities can be reduced with the use of the self-checkout sales data processing apparatus.

However, there is a case in which customers who are not used to the self-checkout sales data processing apparatus, or old people and children who are unfamiliar with the operation hesitate on the way of the operation or make a miss operation on the self-checkout sales data processing apparatus. In this case, the customer has to call an attendant who manages the self-checkout sales data processing apparatus to deal with it; instead, much time is taken.

DESCRIPTION OF THE DRAWINGS

FIG. 5 is a memory map illustrating a flag storage section;

FIG. 6 is a memory map illustrating an example of a position information file;

DETAILED DESCRIPTION

In accordance with an embodiment, a sales data processing apparatus comprises a position storage section configured to store a position of an operation section operated by an operator, a line of sight measurement device configured to measure a position of the line of sight of an operator, a line of sight position storage module configured to store the position of the line of sight measured by the line of sight measurement device, a coincidence determining module configured to determine whether or not the position of an operation section to be operated next by the operator is coincident with the position of the line of sight of the operator stored by the line of sight position storage module, and an operation informing module configured to inform information for instructing an operation of the operation section if the coincidence determining module determines that the position of the operation section to be operated next is not coincident with the position of the line of sight of the operator stored by the line of sight position storage module.

Hereinafter, with reference to FIG. 1~FIG. 17, the sales data processing apparatus according to the present embodiment is described in detail. In the embodiment, a self-checkout POS (Point of Sales) terminal is used as the sales data processing apparatus to describe the present embodiment. A description is made that a commodity is used as a sales object. Further, two types of the settlement methods including a cash settlement and a card (credit card) settlement are exemplified as the settlement type of the self-checkout POS terminal. The present invention is not limited to the embodiment described below.

Figure 1:
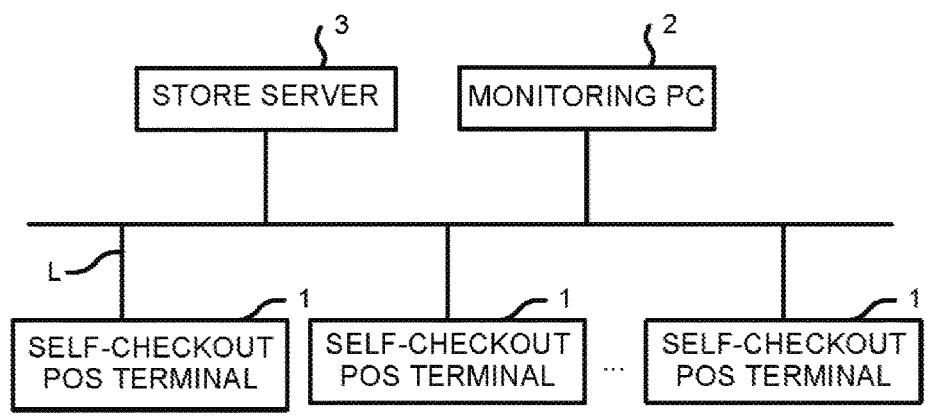
FIG. 1 is a diagram illustrating an overall system including a self-checkout POS terminal according to an embodiment.

First, a system including the self-checkout POS terminal arranged in a store is described. FIG. 1 is a diagram illustrating the overall system including the self-checkout POS terminal according to the present embodiment. As shown in FIG. 1, in the store, a plurality of self-checkout POS terminals 1 that executes a sales registration processing of commodities sold in the store, a monitoring PC (Personal Computer) 2 that monitors these self-checkout POS terminals 1 and a store server 3 that manages sales of the store are electrically connected with one another via a communication line L (for example, a LAN (Local Area Network) line). The communication line L may be either of a wired line or a wireless line.

In the self-checkout POS terminal 1, a customer carries out a sales registration operation and a settlement operation (referred to as a "transaction operation" together) of the commodities by himself or herself. The self-checkout POS terminal 1 executes a sales registration processing and a settlement processing of the commodities relating to a transaction through operating the self-checkout POS terminal 1 by the customer. The sales registration processing refers to processing of optically reading a code symbol such as a barcode attached to a commodity to input the commodity code, displaying a commodity name and a price (commodity information) of the commodity based on the input commodity code and storing the commodity information in a buffer. The settlement processing refers to a processing executed according to the display of the total amount relating to the transaction and deposit amount received from the customer on the basis of the commodity information stored in the buffer along with the sales registration processing. Specifically, the settlement processing refers to a processing of calculating change amount to display the change amount, a processing of instructing a change dispensing machine to dispense the change amount and a processing of issuing a receipt on which the commodity information and settlement information (the total amount, the deposit amount and the change amount) are printed. Further, a processing of the combination of the sales registration processing and the settlement processing is referred to as a transaction processing. The information of the commodities to which the transaction processing is carried out is referred to as sales information.

The monitoring PC 2 monitors the use state of a plurality of the self-checkout POS terminals 1. The monitoring PC 2 receives images obtained by photographing an operation state of the customer on each self-checkout POS terminal 1 by a camera (not shown) via the communication line L and dividedly displays or sequentially displays the images on a display section. An attendant (manager) who operates the monitoring PC 2 monitors an operation of the customer displayed on the display section and supports the operation for the customer in trouble who does not know how to carry out the operation of the self-checkout POS terminal 1.

If the customer operates a help key arranged on each self-checkout POS terminal 1 to request the support, a display pole (refer to FIG. 2) arranged on the self-checkout POS terminal 1 is lighted or blinked. The attendant who sees the lighting or blinking of the display pole supports the customer of the self-checkout POS terminal 1 in the operation.

The store server 3 collects the sales information of the commodities to which the transaction processing is carried out in each self-checkout POS terminal 1 via the communication line L to store the sales information. Then, the store server 3 manages the stored sales information.

Figure 2:
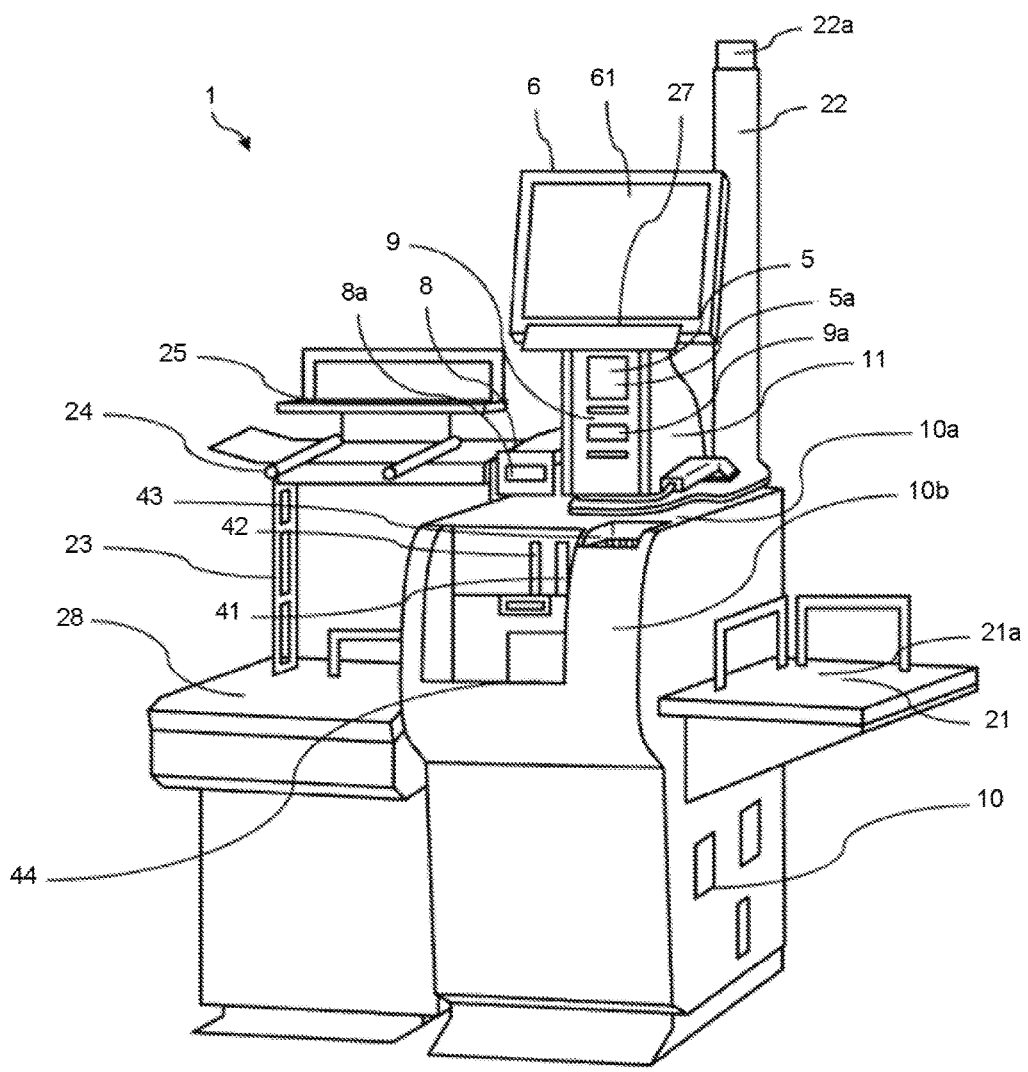
FIG. 2 is a perspective view of the self-checkout POS terminal viewed from an operator side.

Next, the self-checkout POS terminal 1 is described with reference to FIG. 2. FIG. 2 is a perspective view illustrating the appearance of the self-checkout POS terminal 1 viewed from the operator side.

The self-checkout POS terminal 1 includes a loading table 21 at the right side and a loading table 28 at the left side when viewed from the customer side. In the embodiment, the loading table 21 is fixedly mounted on the self-checkout POS terminal 1, and the loading table 28 is separately arranged to the self-checkout POS terminal 1. In the embodiment, the number of the loading tables 28 is one however, it is possible that two or more loading tables 28 are installed.

The loading table 21 includes a receiving surface 21a. The loading table 21 is used to place a basket (not shown), in which a commodity to which the sales registration processing is not yet carried out is put, on the receiving surface 21a. The loading table 28 includes a plurality of rob-shaped support sections 24 at the upper part of thereof. The support section 24 hangs a bag in which a commodity to which the sales registration processing is carried out is put to support it. Further, the loading table 28 includes a temporary placing table 25 for temporarily placing the commodity to which the sales registration processing is carried out. The support section 24 and the temporary placing table 25 are arranged at the upper part of the loading table 28 through a strut 23 extending upwards from the loading table 28.

Further, the self-checkout POS terminal 1 includes a first housing 10 and a second housing 11 on the upper surface of the first housing 10. The first housing 10 includes a control section 300 described later in FIG. 4 and a card reader/writer 8 on an upper surface part 10a. A card insertion port 8a for inserting a card is arranged at the front part of the card reader/writer 8. The card reader/writer 8 reads information of a credit card (hereinafter, simply referred to as a "card") inserted into the card insertion port 8a. The card reader/writer 8 writes information into the card inserted into the card insertion port 8a. Further, the card reader/writer 8 discharges the card inserted into the card insertion port 8a towards the front direction.

The first housing 10 includes a cash depositing/dispensing section 26 therein. The cash depositing/dispensing section 26 stores money (cash). The cash depositing/dispensing section 26 deposits money (cash) received from the customer to store it. Further, the cash depositing/dispensing section 26 dispenses change to the customer from the cash stored therein. The first housing 10 includes a cash depositing/dispensing port for depositing and dispensing money into and from the cash depositing/dispensing section 26 on a front part 10b where the customer acting as an operator stands. Specifically, on the front part 10b, the first housing 10 includes a bill depositing port 41 for depositing bills to the cash depositing/dispensing section 26, a bill dispensing port 42 for dispensing bills as change from the cash depositing/dispensing section 26, a coin depositing port 43 for depositing coins to the cash depositing/dispensing section 26 and a coin dispensing port 44 for dispensing coins as change from the cash depositing/dispensing section 26.

On the other hand, the second housing 11 includes a reading section 5 and a printing section 9 therein and a display section 6 on the upper surface part. Further, the second housing 11 includes a line of sight tracking section 27 at the lower side of the display surface of the display section 6. The reading section 5 includes a reading window 5a for emitting laser light and receiving laser light reflected by a code symbol on the front part thereof. The reading section 5 is a code reader for emitting laser light from the reading window 5a to the outside in a scanning manner and receiving the laser light reflected by the code symbol attached to the commodity to read information of the code symbol. Further, the reading section 5 may photograph the commodity with a camera. In this case, general object recognition is carried out on a captured image to specify the commodity. The printing section 9 includes a receipt issuing port 9a at the front part. The printing section 9 issues a receipt on which the sales information of the commodities to which the transaction processing is carried out is printed from the receipt issuing port 9a.

The display section 6 constituted, for example, with a liquid crystal panel displays commodity information of the commodities to which the sales registration processing is carried out and the settlement information of the commodities to which the settlement processing is carried out. The display section 6 is arranged with an input section 61 constituted by a touch panel on a display surface thereof. The input section 61 receives the input of a specific key operated by touching each position on the touch panel corresponding to the display of keys including a start key 611, a closing key 612, a cash settlement key 613 and a card settlement key 614 (refer to FIG. 4) respectively displayed at predetermined positions on the display section 6. For the convenience of the description, it is described that the keys displayed on the display section 6 are operated. The start key 611 is operated when the customer stands at a predetermined position at the time of starting the transaction processing of the self-checkout POS terminal 1, and a start signal is input if the customer operates the start key to start the transaction processing. Further, instead of the start key 611, a sensor (for example, weight sensor) for detecting that the customer stands at the predetermined position to start the operation may be arranged to input the start signal if the sensor detects the customer. Thus, the start signal is input when the customer stands at the predetermined position.

The display section 6 displays procedures of the operations of the self-checkout POS terminal 1. The operation procedures according to the present embodiment includes:
1. Operating the start key 611,
2. Reading the code symbol attached to the commodity,
3. Operating the closing key 612,
4. Selecting a settlement method,
5. Depositing cash or inserting card,
6. Receiving change, and
7. Receiving the receipt.

The display section 6 displays a next operation in order as described above with the progress of the operation.

The line of sight tracking section 27 which is arranged at the lower part of the display section 6 tracks movement of the line of sight of the customer who operates the self-checkout POS terminal 1. The line of sight tracking section 27 uses a well-known technology of capturing a face, eyeballs, corneal reflection of a person with an infrared camera to track the movement of the line of sight. The line of sight tracking section 27 continuously measures position information indicating which direction the line of sight of the person faces or which point the line of sight of the person gazes at at predetermined time intervals and outputs the measured position information. Further, it is desired that the line of sight tracking section 27 is arranged at the lower part of the display section 6 to face the customer to correctly track the movement of the line of sight; however, it is not necessary to be arranged in that manner. For example, the line of sight tracking section 27 may be arranged at the upper part of the display section 6.

Figure 3:
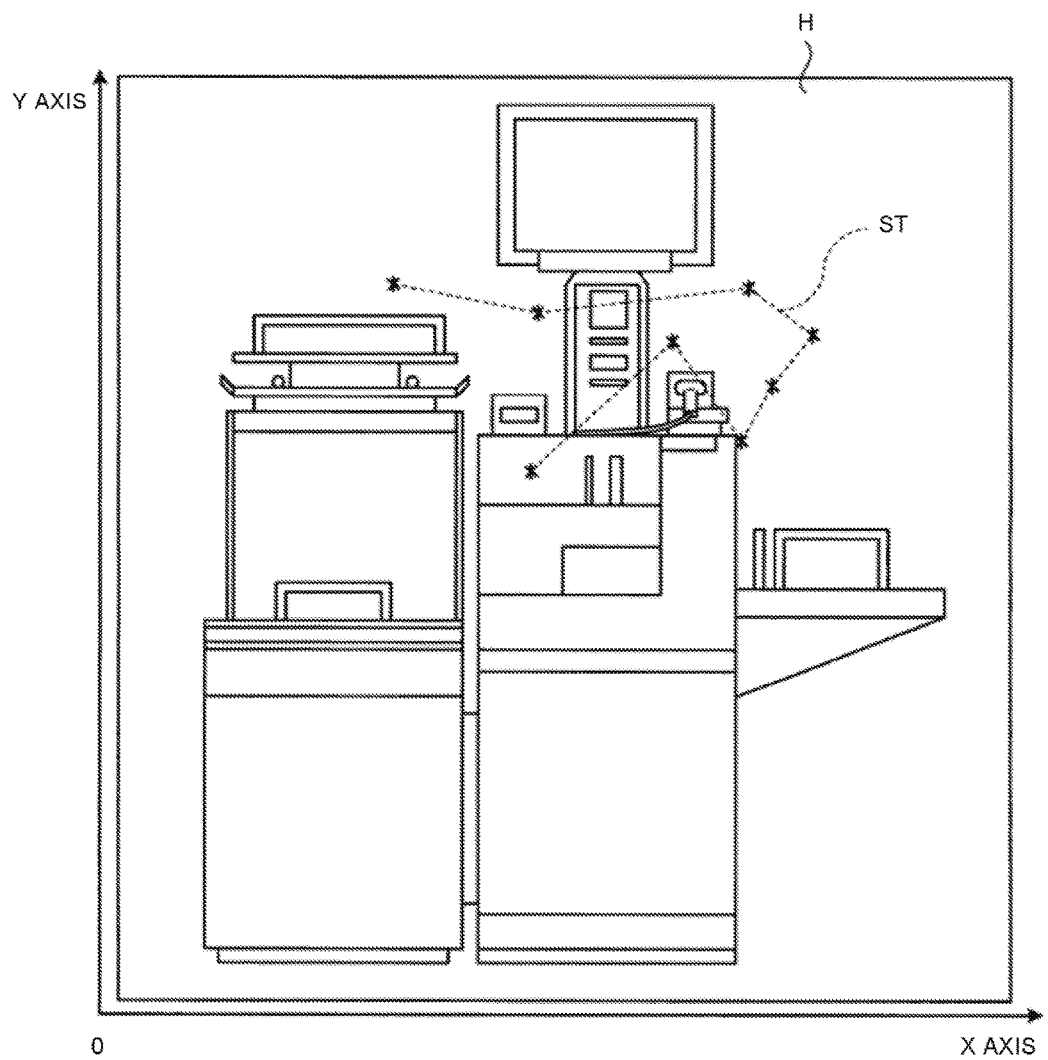
FIG. 3 is a diagram obtained by tracking a line of sight of a customer.

FIG. 3 is a schematic diagram illustrating the movement of the line of sight of the customer plotted in a virtual space H on a plane on the basis of the position information (coordinate information) from the line of sight tracking section 27. The virtual space H includes a coordinate of X axis in the horizontal direction and a coordinate of Y axis in the vertical direction. In FIG. 3, on the basis of the position information of the line of sight of the customer from the line of sight tracking section 27, a line of sight ST plotted at a time interval of, for example, each one second is illustrated on the virtual space H. "*" mark is a position of the line of sight of the customer at the interval of one second, and the line of sight of the customer can be tracked by connecting each "*" (dotted line in FIG. 3).

FIG. 3 is a diagram relatively illustrating a relationship between the position of the line of sight and the position of the self-checkout POS terminal 1 by enabling images of the self-checkout POS terminal 1 to be synthesized with the plotted movement of the line of sight of the customer.

An operation section 38 is described. The operation section 38 is a part of the self-checkout POS terminal 1 operated by the customer, and in the embodiment, refers to the start key 611, the closing key 612, the cash settlement key 613, the card settlement key 614, the reading window 5a, the card insertion port 8a, the bill depositing port 41, the bill dispensing port 42, the coin depositing port 43, the coin dispensing port 44 and the receipt issuing port 9a. The operation section 38 may be another part operated by the customer.

Next, operations of the operation section 38 are described. The operations of the start key 611, the closing key 612, the cash settlement key 613 and the card settlement key 614 refer to the operations on the input section 61 at positions corresponding to each key displayed on the display section 6. The operation of the reading window 5a refers to enabling the code symbol attached to the commodity to pass through the front of the reading window 5a. The operation of the card insertion port 8a refers to an operation of inserting the card into the card insertion port 8a and an operation of removing the card from the card insertion port 8a. The operation of the bill depositing port 41 refers to an operation of depositing bills into the bill depositing port 41. The operation of the bill dispensing port 42 refers to an operation of removing bills from the bill dispensing port 42. The operation of the coin depositing port 43 refers to an operation of depositing coins into the coin depositing port 43. The operation of the coin dispensing port 44 refers to an operation of removing coins from the coin dispensing port 44. The operation of the receipt issuing port 9a refers to an operation of removing the receipt from the receipt issuing port 9a.

In the embodiment, light emitting sections 37 constituted by LEDs (Light Emitting Diodes) are arranged nearby the reading window 5a, the card insertion port 8a, the bill depositing port 41, the bill dispensing port 42, the coin depositing port 43, the coin dispensing port 44 and the receipt issuing port 9a among the operation sections 38 in a manner of respectively surrounding the individual operation section 38. The light emitting section 37 of each section lights or blinks to visually notify the customer of the position of the operation section 38 operated by the customer as information instructing the operation. The light emitting sections 37 are arranged in a manner of respectively surrounding each operation section 38, but may be arranged at positions adjacent to each operation section 38.

The customer who carries out a transaction operation to purchase the commodity places the basket in which the commodity to which the sales registration processing is not carried out is put on the loading table 21. Then, the customer operates the start key 611. The customer takes out the commodity from the basket placed on the loading table 21 and holds the commodity to pass through the front of the reading section 5. The self-checkout POS terminal 1 reads information of the code symbol attached to the commodity which crosses the reading window 5a to carry out the sales registration processing. Next, the customer packs the commodity to which the sales registration processing is executed in a bag supported by the support section 24. The customer temporarily places a fragile commodity, such as tofu and eggs, which is required to take care on the temporary placing table 25 after the fragile commodity passes through the front of the reading section 5. After packing other commodities in the bag, the customer puts the fragile commodity placed on the temporary placing table 25 on the other commodities to pack it in the bag. The customer who bags all the commodities operates the closing key 612 to declare the termination of the transaction. Then, the customer operates the cash settlement key 613 (in other words, selects the cash settlement) or operates the card settlement key 614 (in other words, selects the card settlement). In a case in which the cash settlement is selected, the customer deposits cash into the bill depositing port 41 or the coin depositing port 43. If there is change, the customer receives the change from the bill dispensing port 42 or the coin dispensing port 44. In a case in which the card settlement is selected, the customer inserts the card into the card insertion port 8*a*, and removes the card from the card insertion port 8*a* after the settlement is terminated. Next, the customer takes out the receipt from the receipt issuing port 9*a*. At last, the customer takes off the bag from the support section 24 to terminate the transaction operation.

The self-checkout POS terminal 1 includes a columnar display pole 22 arranged uprightly behind the upper surface part 10*a* of the first housing 10. The display pole 22 includes a light emitting section 22*a* that selectively emits blue light or red light at the top end part. Colors of the light emitting section 22*a* of the display pole 22 indicate a current state of the self-checkout POS terminal 1. In a case in which the light emitting section 22*a* emits blue light, it indicates that the self-checkout POS terminal 1 operates normally. In a case in which the light emitting section 22*a* emits red light, it indicates that the self-checkout POS terminal 1 operates in an abnormal state. The abnormal state refers to a state in which, for example, the customer carries out an operation different from a normal operation and thus requires the support of the attendant. The attendant comes to the self-checkout POS terminal 1 of which the light emitting section 22*a* emits red light to give the support.

Figure 4:
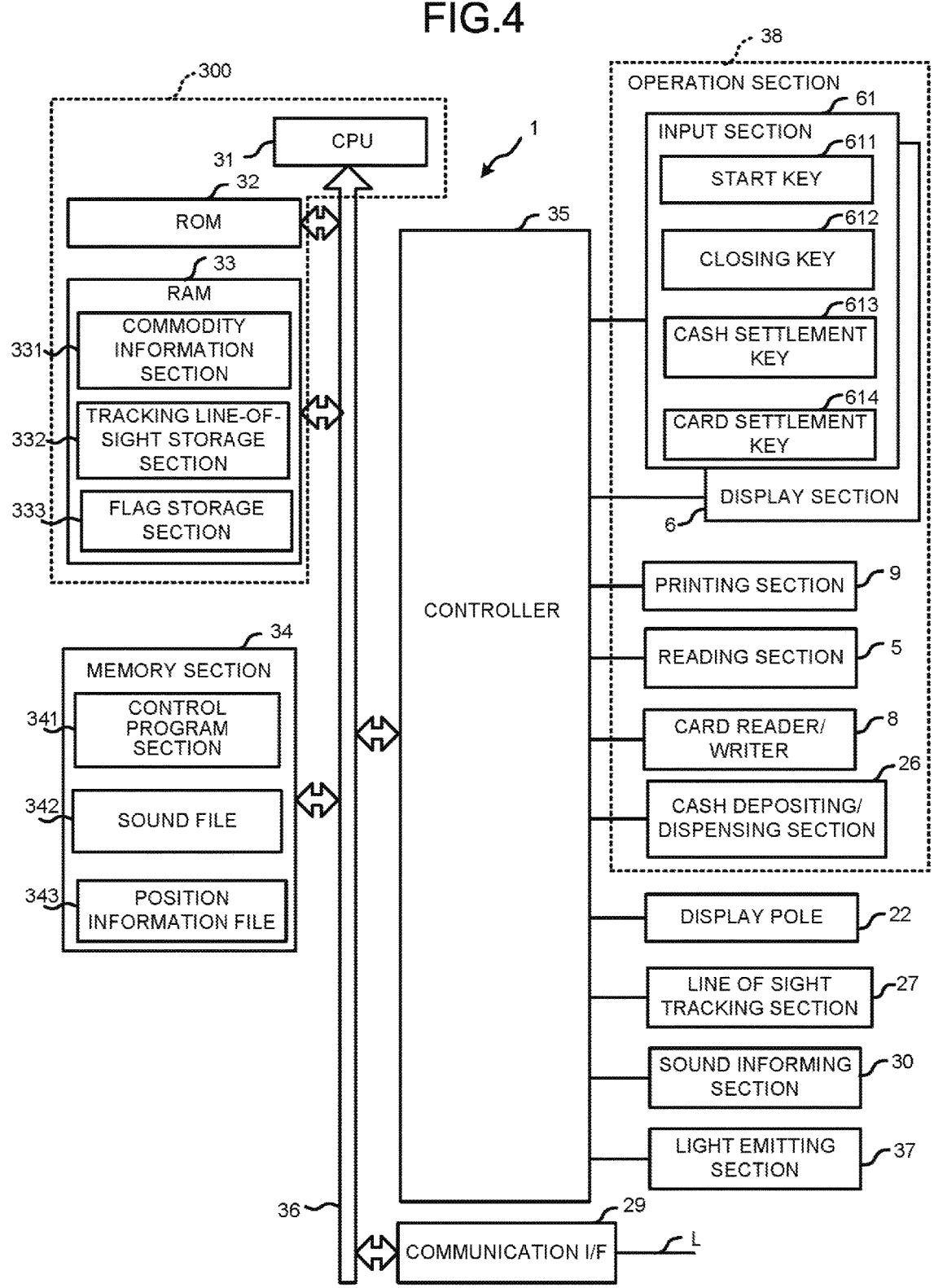
FIG. 4 is a block diagram illustrating the hardware structure of the self-checkout POS terminal.

Next, the hardware structure of the self-checkout POS terminal 1 is described with reference to a block diagram in FIG. 4. As shown in FIG. 4, the self-checkout POS terminal 1 is equipped with a CPU (Central Processing Unit) 31 serving as a main part of control. The self-checkout POS terminal 1 is also equipped with a ROM (Read Only Memory) 32 that stores various programs and a RAM (Random Access Memory) 33 that functions as a working area of the CPU 31. Further, the self-checkout POS terminal 1 is provided with a memory section 34 constituted by an HDD or a flash memory that stores various programs. The CPU 31, the ROM 32, the RAM 33 and the memory section 34 are connected with one another via a data bus line 36.

The CPU 31, the ROM 32 and the RAM 33 constitute a control section 300. The control section 300 executes a control processing described later in such a manner that the CPU 31 operates according to a control program, copied or decompressed on the RAM 33, which is stored in a control program section 341 of the memory section 34.

The RAM 33 also stores various data. The RAM 33 includes a commodity information section 331, a tracking line-of-sight storage section 332 and a flag storage section 333. The commodity information section 331 stores commodity information of each commodity to which the sales registration processing is carried out. The tracking line-of-sight storage section stores the coordinate information serving as the position information of the line of sight of the person output from the line of sight tracking section 27 at each predetermined time (for example, per second). The flag storage section 333 stores flags indicating states of various kinds of control described later.

FIG. 5 is a diagram illustrating in detail the flag storage section 333. In FIG. 5, the flag storage section 333 is provided with an announcement flag A section 3331, an announcement flag B section 3332, an announcement flag C section 3333, an announcement flag D section 3334, an announcement flag E section 3335, an announcement flag F section 3336, an announcement flag G section 3337 and an announcement flag H section 3338. The announcement flag A section 3331 stores a state of a flag A. The announcement flag B section 3332 stores a state of a flag B. The announcement flag C section 3333 stores a state of a flag C. The announcement flag D section 3334 stores a state of a flag D. The announcement flag E section 3335 stores a state of a flag E. The announcement flag F section 3336 stores a state of a flag F. The announcement flag G section 3337 stores a state of a flag G. The announcement flag H section 3338 stores a state of a flag H. The flag A to the flag H are descried later.

Return to the description of FIG. 4. The memory section 34 is further provided with the control program section 341, a sound file 342 and a position information file 343. The control program section 341 stores a program that controls the operation of the self-checkout POS terminal 1.

The sound file 342 stores announcement information composed of various kinds of sound information to be notified to the customer. A sound announcement serving as information for instructing the customer to carry out an operation is stored in the sound file 342.

The sound file 342 stores a sound announcement for instructing the customer to hold the commodity to pass through the reading section 5 to read the code symbol or for instructing the customer to operate the closing key 612. For example, the sound announcement is an announcement like "Please take out the commodity from the basket and hold it to pass over the window, or touch the closing key". In a case in which this sound is informed to the customer, the flag A stored in the announcement flag A section 3331 is set to "1". In other words, if the flag A is "1", it indicates that the sound announcement for instructing the customer to hold the commodity to pass through the reading section 5 to read the code symbol or for instructing the customer to operate the closing key 612 is informed. On the other hand, if the flag A is "0", it indicates that the sound announcement is not informed yet.

Further, the sound file 342 stores a sound announcement for instructing the customer to operate the cash settlement key 613 or the card settlement key 614. For example, the sound announcement is an announcement like "Please touch the cash settlement key in a case of payment with the cash. Please touch the card settlement key in a case of payment with the card". In a case in which this sound is informed to the customer, the flag B stored in the announcement flag B section 3332 is set to "1". In other words, if the flag B is "1", it indicates that the sound announcement for instructing the customer to operate the cash settlement key 613 or the card settlement key 614 is informed. On the other hand, if the flag B is "0", it indicates that the sound announcement is not yet informed.

The sound file 342 stores a sound announcement for instructing the customer to deposit bills or coins into the bill depositing port 41 or the coin depositing port 43. For example, the sound announcement is an announcement like "Please see the total amount and deposit bills into the bill depositing port and coins into the coin depositing port". In a case in which this sound is informed to the customer, the flag C stored in the announcement flag C section 3333 is set to "1". In other words, if the flag C is "1", it indicates that the sound announcement for instructing the customer to deposit bills and/or coins is informed. On the other hand, if the flag C is "0", it indicates that the sound announcement is not informed yet.

The sound file 342 stores a sound announcement for instructing the customer to take out change from the bill dispensing port 42 or the coin dispensing port 44. For example, the sound announcement is an announcement like "Please take out change dispensed from the bill dispensing port or the coin dispensing port". In a case in which this sound is informed to the customer, the flag D stored in the announcement flag D section 3334 is set to "1". In other words, if the flag D is "1", it indicates that the sound announcement for instructing the customer to take out bills and coins as the change is informed. On the other hand, if the flag D is "0", it indicates that the sound announcement is not informed yet.

The sound file 342 stores a sound announcement for instructing the customer who pays with cash to take out the receipt from the receipt issuing port 9a. For example, the sound announcement is an announcement like "The receipt is issued from the receipt issuing port. Please take out the receipt". In a case in which this sound is informed to the customer, the flag E stored in the announcement flag E section 3335 is set to "1". In other words, if the flag E is "1", it indicates that the sound announcement for instructing the customer to take out the receipt is informed. On the other hand, if the flag E is "0", it indicates that the sound announcement is not informed yet.

The sound file 342 stores a sound announcement for instructing the customer to insert his or her card into the card insertion port 8a. For example, the sound announcement is an announcement like "Please insert card into the card insertion port". In a case in which this sound is informed to the customer, the flag F stored in the announcement flag F section 3336 is set to "1". In other words, if the flag F is "1", it indicates that the sound announcement for instructing the customer to insert his or her card is informed. On the other hand, if the flag F is "0", it indicates that the sound announcement is not informed yet.

The sound file 342 stores a sound announcement for instructing the customer to take out the card from the card insertion port 8a. For example, the sound announcement is an announcement like "Please take out the card from the card insertion port". In a case in which this sound is informed to the customer, the flag G stored in the announcement flag G section 3337 is set to "1". In other words, if the flag G is "1", it indicates that the sound announcement for instructing the customer to take out the card is informed. On the other hand, if the flag G is "0", it indicates that the sound announcement is not informed yet.

Further, the sound file 342 stores a sound announcement for instructing the customer who pays with card to take out the receipt from the receipt issuing port 9a. For example, the sound announcement is an announcement like "The receipt is issued from the receipt issuing port. Please take out the receipt". In a case in which this sound is informed to the customer, the flag H stored in the announcement flag H section 3338 is set to "1". In other words, if the flag H is "1", it indicates that the sound announcement for instructing the customer to take out the receipt is informed. On the other hand, if the flag H is "0", it indicates that the sound announcement is not informed yet.

The position information file 343 stores coordinate information indicating center positions of the reading window 5a, the card insertion port 8a, the bill depositing port 41, the bill dispensing port 42, the coin depositing port 43, the coin dispensing port 44 and the receipt issuing port 9a. Further, the position information file 343 stores coordinate information (coordinate information on the plane in the foregoing virtual space H) illustrating center positions of display of the start key 611, the closing key 612, the cash settlement key 613 and the card settlement key 614, displayed on the display section 6, which are operated by the customer.

FIG. 6 is a diagram illustrating the position information file 343. In the embodiment, the coordinate information section 3431 stores the position information (coordinate information in the virtual space H) respectively corresponding to the reading window 5a, the card insertion port 8a, the bill depositing port 41, the bill dispensing port 42, the coin depositing port 43, the coin dispensing port 44, the receipt issuing port 9a, the start key 611, the closing key 612, the cash settlement key 613 and the card settlement key 614. For example, the position information of the start key 611 in the virtual space H is XsYs. In this example, XsYs indicates a position in which the position of X coordinate is s and the position of Y coordinate is s, in other words, XsYs indicates that the start key 611 is located at a position where the position s on the X axis and the position s on the Y axis cross each other in the virtual space H.

Return to the description of FIG. 4. The data bus line 36 connects the input section 61, the display section 6, the printing section 9, the reading section 5, the card reader/writer 8, the cash depositing/dispensing section 26, the display pole 22, the line of sight tracking section 27 and a sound informing section 30 with the control section 300 via a controller 35. The sound informing section 30 includes, for example, a speaker therein to inform the customer of the sound announcement stored in the sound file 342 with voice. Further, the data bus line 36 connects a communication I/F (Interface) 29 with the control section 300, and the communication I/F 29 is connected with another self-checkout POS terminal 1, the monitoring PC 2, the store server 3, the camera for monitoring the self-checkout POS terminal 1 via the communication line L.

Figure 7:
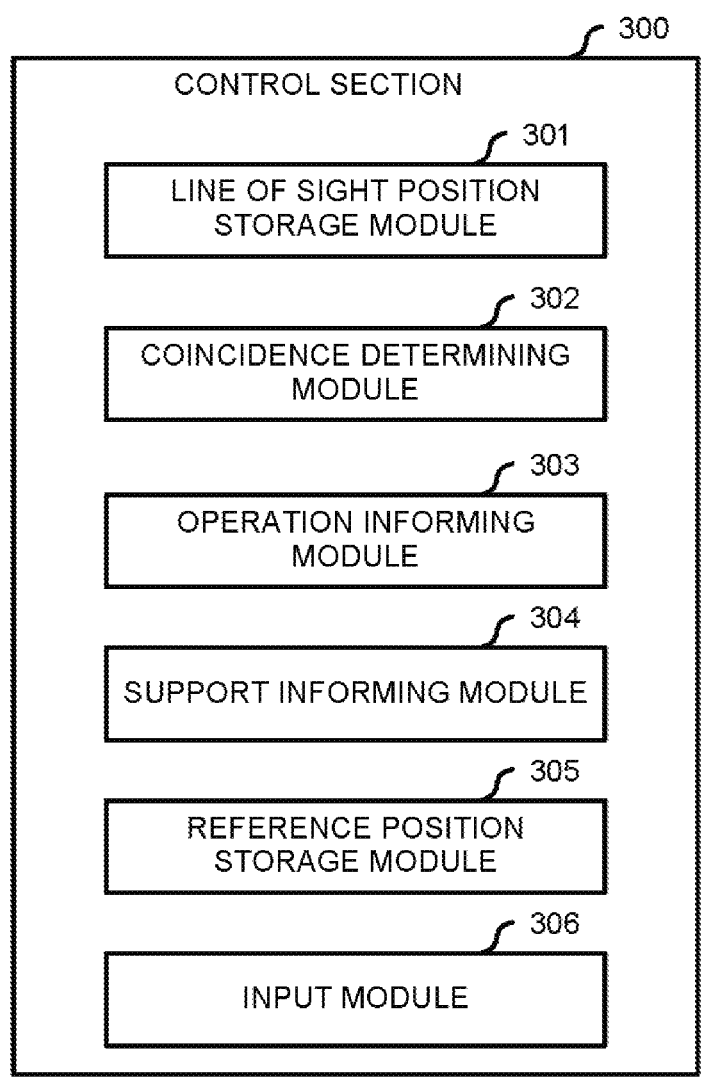
FIG. 7 is a functional block diagram illustrating functional components of the self-checkout POS terminal.
Figure 8:
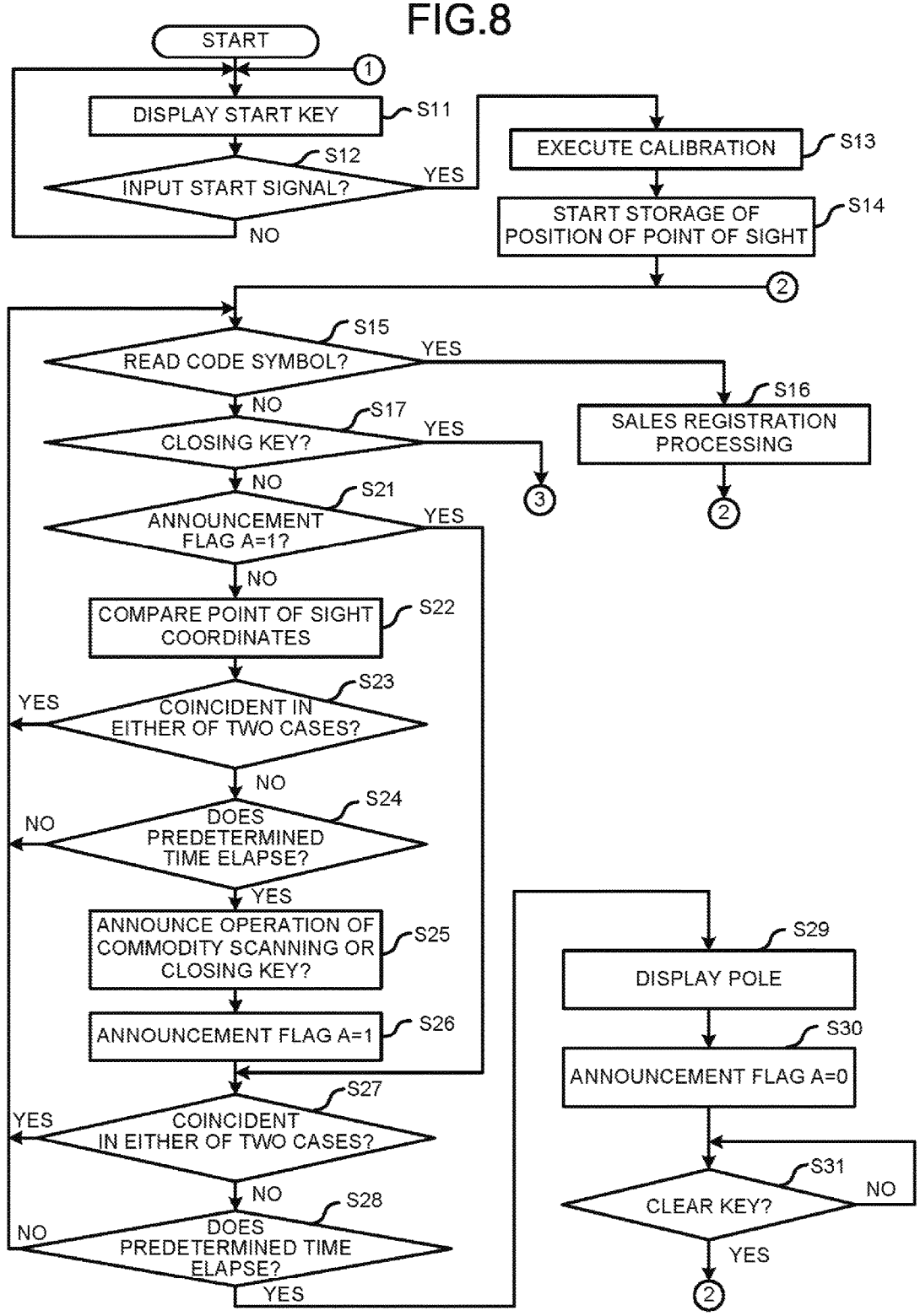
FIG. 8 is a flowchart illustrating the flow of the control processing of the self-checkout POS terminal.
Figure 9:
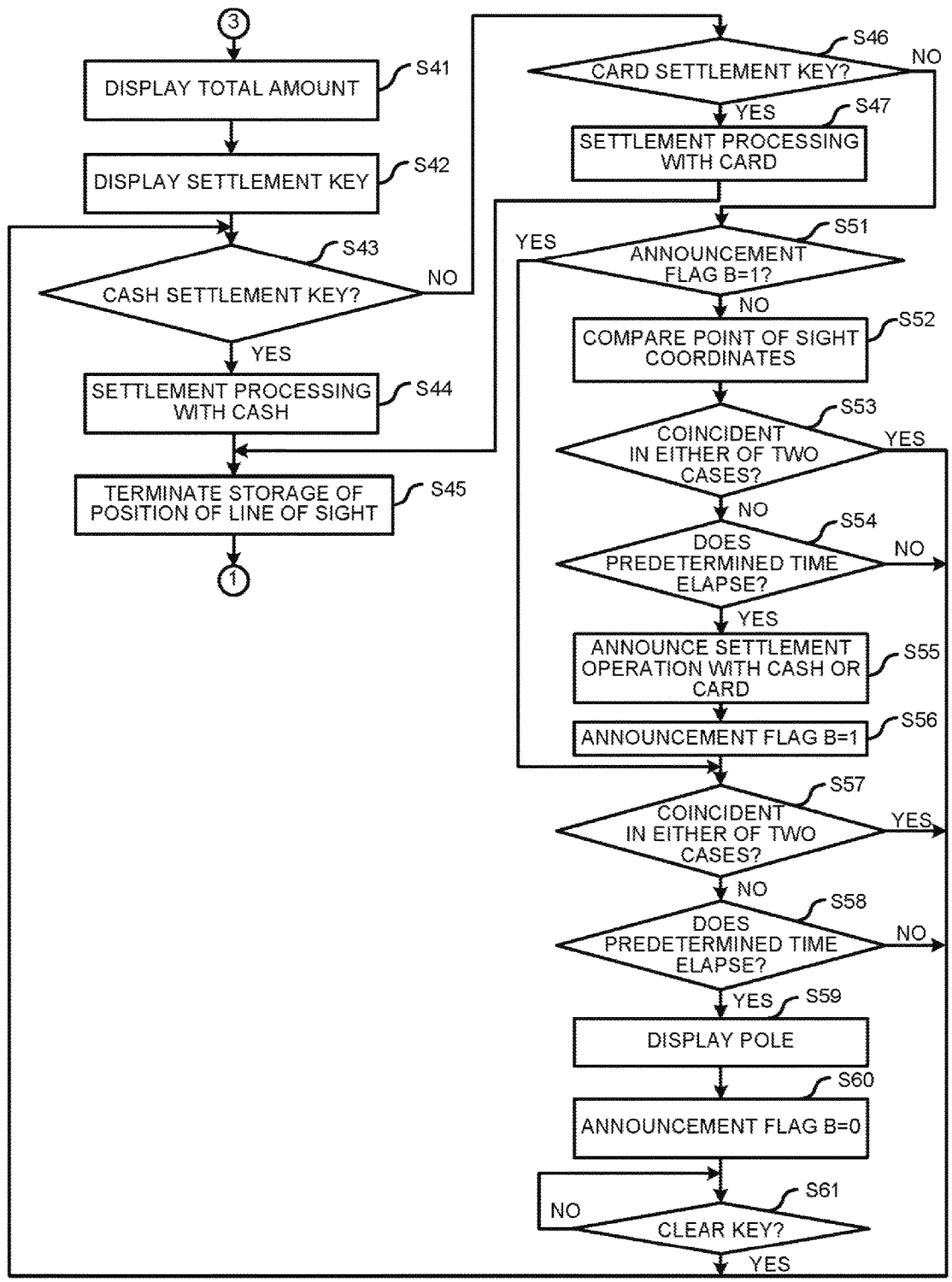
FIG. 9 is a flowchart illustrating the flow of a control processing by the self-checkout POS terminal.

Next, the control processing of the self-checkout POS terminal 1 is described with reference to FIG. 7~FIG. 17. FIG. 7 is a block diagram illustrating functional components of the self-checkout POS terminal 1. The control section 300 functions as a line of sight position storage module 301, a coincidence determining module 302, an operation informing module 303, a support informing module 304, a reference position storage module 305 and an input module 306 according to the control program stored in the control program section 341 of the memory section 34.

The line of sight position storage module 301 has a function of storing the position of the line of sight measured by a line of sight measurement device.

The coincidence determining module 302 has a function of determining whether or not the position of the operation section 38 to be operated next by the customer is coincident with the position of the line of sight of the customer stored by the line of sight position storage module 301.

The operation informing module 303 has a function of informing information for instructing the customer to operate the operation section 38 (to be operated next) if the coincidence determining module 302 determines that the position of the operation section 38 to be operated next is not coincident with the position of the line of sight of the customer stored by the line of sight position storage module 301.

The support informing module 304 has a function of outputting information for requesting the support of the operator if the coincidence determining module 302 determines that the position of the operation section 38 is not coincident with the position of the line of sight of the customer over a certain time after the operation informing module 303 informs the position of the operation section 38.

The reference position storage module 305 has a function of storing the position of the line of sight of the customer at a point in time when the customer starts the operation relating to the sales of the commodities as a reference position.

The input module 306 has a function of inputting the start signal indicating that the person (customer) operates the specific start key 611.

FIG. 8~FIG. 17 are flowcharts illustrating the flow of the control processing of the self-checkout POS terminal 1. The control section 300 displays the start key 611 on the display section 6 of the self-checkout POS terminal 1 which is not being used by the customer (ACT S11).

The customer places the basket in which the purchased commodity is put on the loading table 21. Then, the customer first operates the start key 611 displayed on the display section 6 to start the use of the self-checkout POS terminal 1. The control section 300 (input module 306) determines whether or not the start key 611 is operated and the start signal is input to the controller 35 (ACT S12). The control section 300 waits for until the start signal is input (No in ACT S12). If it is determined that the start signal is input (Yes in ACT S12), the control section 300 (reference position storage module 305) executes a calibration (ACT S13).

The calibration is an operation of recognizing the line of sight of the customer with the use of the line of sight tracking section 27 serving as the line of sight measurement device and calculating a deviation between the position of the line of sight of the customer when the customer operates the start key 611 and the coordinate (XsYs) of the predetermined reference position. In other words, even if eye levels are different according to a height difference of each customer, the coordinate of the same reference position is applied to the individual position of height of the eyes. In this way, regardless of the height difference of each customer, a positional relation between the position of the line of sight and the operation section 38 can be correctly grasped. The control section 300 stores the position (reference position) and determines positions of later lines of sight on the basis of the reference position.

After executing the calibration, the control section 300 (line of sight position storage module 301) inputs the information of the position of the line of sight of the customer output from the line of sight tracking section 27 to start storage of the information (ACT S14).

Next, the customer carries out jobs of taking out the commodity from the basket placed on the loading table 21, holding the commodity to pass through the front of the reading window 5a and packing the commodity in the bag arranged on the loading table 28. After packing all the commodities from the basket in the bag, the customer operates the closing key 612. The control section 300 determines whether or not the code symbol attached to the commodity, which is passed across the front of the reading window 5a, is read by the reading section 5 (ACT S15). If the code symbol is not read (No in ACT S15), the control section 300 determines whether or not the closing key 612 is operated (ACT S17).

If it is determined that the code symbol is read (Yes in ACT S15), the control section 300 executes the sales registration processing for storing the commodity information of the commodity read from a commodity master file (not shown) in the commodity information section 331 on the basis of the read code symbol (ACT S16). Then, the control section 300 returns to the processing in ACT S15.

If it is determined that the code symbol is not read and the closing key 612 is not operated either (No in ACT S17), the control section 300 determines whether or not the flag A of the announcement flag A section 3331 in the flag storage section 333 is "1" (ACT S21). If the flag A of the announcement flag A section 3331 is "0", in other words, in a case in which the sound announcement for instructing the customer to hold the commodity to pass through the reading section 5 to read the code symbol or for instructing the customer to operate the closing key 612 is not informed yet (No in ACT S21), the control section 300 compares a current position of the line of sight of the customer of which the tracking is started in ACT S14 with a position (Xm0Yn0) of the reading section 5 (ACT S22). Further, the control section 300 compares the current position of the line of sight of the customer with a position (Xm1Yn1) of the closing key 612 (ACT S22). Then, the control section 300 (coincidence determining module 302) determines whether or not the current position of the line of sight of the customer is coincident with either the position (Xm0Yn0) of the reading section 5 or the position (Xm1Yn1) of the closing key 612, which are compared in ACT S22 (ACT S23).

The coincidence described above indicates that the position of the line of sight of the customer continuously stays at the position (Xm0Yn0) of the reading section 5 or peripheral positions thereof, or the position (Xm1Yn1) of the closing key 612 or peripheral positions thereof for a predetermined time. In a case in which the position of the line of sight of the customer continuously stays at the position (Xm0Yn0) of the reading section 5 or the peripheral positions thereof for the predetermined time (in other words, if the current position of the line of sight of the customer is coincident with the position (Xm0Yn0) of the reading section 5), the customer gazes at the reading section 5. Further, in a case in which the position of the line of sight of the customer continuously stays at the position (Xm1Yn1) of the closing key 612 or the peripheral positions thereof for the predetermined time (in other words, the current position of the line of sight of the customer is coincident with the position (Xm1Yn1) of the closing key 612), the customer gazes at the closing key 612. The coincidence also has the same meaning in each following processing.

If it is determined that a comparison result of either of the two cases indicates the coincidence (Yes in ACT S23), the control section 300 returns to the processing in ACT S15. If it is determined that the comparison results of both cases do not indicate the coincidence (No in ACT S23), the control section 300 determines whether or not the predetermined time elapses in a state in which the comparison results of both cases do not indicate the coincidence (ACT S24). If it is determined that the predetermined time does not elapse (No in ACT S24), the control section 300 returns to the processing in ACT S15. If it is determined that the predetermined time elapses (Yes in ACT S24), the control section 300 determines that the customer does not see the reading section 5 or the closing key 612. Thus, the control section 300 (operation informing module 303) reads out the sound announcement for instructing the customer to hold the commodity to pass through the reading section 5 to read the code symbol or for instructing the customer to operate the closing key 612 from the sound file 342 to inform the customer of the sound announcement with voice from the sound informing section 30 (ACT S25). At the same time, the control section 300 lights or blinks the light emitting section 37 arranged around the reading window 5a. The control section 300 displays the closing key 612 on the display section 6 in a blinking manner. In this way, the control section 300 informs the customer of the position of the reading window 5a and the position of the closing key 612. Then, the control section 300 sets the flag A stored in the announcement flag A section 3331 of the flag storage section 333 to "1" (ACT S26).

Next, the control section 300 determines whether or not the current position of the line of sight of the customer is coincident with either the position (Xm0Yn0) of the reading section 5 or the position (Xm1Yn1) of the closing key 612 again (ACT S27). If it is determined that a comparison result of either of the two cases (reading section or closing key) indicates the coincidence (Yes in ACT S27), the control section 300 returns to the processing in ACT S15. If it is determined that the comparison results of both cases do not indicate the coincidence (No in ACT S27), the control section 300 determines whether or not the predetermined time elapses in a state in which the comparison results of both cases do not indicate the coincidence (ACT S28). If it is determined that the predetermined time does not elapse (No in ACT S28), the control section 300 returns to the processing in ACT S15. If it is determined that the predetermined time elapses (Yes in ACT S28), the control section 300 (support informing module 304) enables the light emitting section 22a of the display pole 22 to emit red light to display the display pole in red (ACT S29), and automatically requests the attendant to give the support. Then, the control section 300 sets the flag A stored in the announcement flag A section 3331 of the flag storage section 333 to "0" (ACT S30).

The attendant who sees the display pole 22 displayed in red supports the customer in the self-checkout POS terminal 1. In this case, the attendant supports the operation of passing the code symbol attached to the commodity across the reading section 5 or the operation of the closing key 612 for the customer.

Next, the control section 300 determines whether or not a clear key (not shown) is operated by the attendant or the customer (ACT S31). The control section 300 waits for until the clear key is operated (No in ACT S31). If it is determined that the clear key is operated (Yes in ACT S31), the control section 300 returns to the processing in ACT S15.

Further, in ACT S21, if it is determined that the flag A of the announcement flag A section 3331 is "1" (Yes in ACT S21), the control section 300 executes the processing in ACT S27 and the processing subsequent to ACT S27.

Further, in ACT S17, if it is determined that the closing key 612 is operated (Yes in ACT S17), the control section 300 displays the total amount of the commodities to which the sales registration processing is carried out on the display section 6 (ACT S41). Then, the control section 300 displays the cash settlement key 613 and the card settlement key 614 on the display section 6 (ACT S42). The customer operates the displayed cash settlement key 613 or card settlement key 614 to select a settlement method.

The control section 300 determines whether or not the cash settlement key 613 is operated (ACT S43). In a case in which the cash settlement key 613 is not operated (No in ACT S43) the control section 300 determines whether or not the card settlement key 614 is operated (ACT S46).

If it is determined that the cash settlement key 613 is operated (Yes in ACT S43), the control section 300 executes a settlement processing with cash (ACT S44). Next, the control section 300 terminates the storage of the position of the line of sight started in ACT S14 (ACT S45). Then, the control section 300 returns to the processing in ACT S11. If it is determined that the card settlement key 614 is operated (Yes in ACT S46), the control section 300 executes a settlement processing with card (ACT S47). Then, the control section 300 executes the processing in ACT S45 and returns to the processing in ACT S11.

If it is determined that neither the cash settlement key 613 nor the card settlement key 614 is operated (No in ACT S46), the control section 300 determines whether or not the flag B in the announcement flag B section 3332 of the flag storage section 333 is "1" (ACT S51). If the flag B of the announcement flag B section 3332 is "0", in other words, in a case in which the sound announcement for instructing the customer to operate the cash settlement key 613 or the card settlement key 614 is not informed yet (No in ACT S51), the control section 300 compares the current position of the line of sight of the customer of which the storage is started in ACT S14 with a position (Xm2Yn2) of the cash settlement key 613 (ACT S52). Further, the control section 300 compares the current position of the line of sight of the customer with a position (Xm3Yn3) of the card settlement key 614 (ACT S2 ACT S52). Then, the control section 300 (coincidence determining module 302) determines whether or not the current position of the line of sight of the customer is coincident with either the position (Xm2Yn2) of the cash settlement key 613 or the position (Xm3Yn3) of the card settlement key 614, which are compared in ACT S52 (ACT S53).

If it is determined that a comparison result of either of the two cases indicates the coincidence (Yes in ACT S53), the control section 300 returns to the processing in ACT S43. If it is determined that the comparison results of both cases do not indicate the coincidence (No in ACT S2 ACT S53), the control section 300 determines whether or not the predetermined time elapses in a state in which the comparison results of both cases do not indicate the coincidence (ACT S54). If it is determined that the predetermined time does not elapse (No in ACT S54), the control section 300 returns to the processing in ACT S43. If it is determined that the predetermined time elapses (Yes in ACT S54), the control section 300 (operation informing module 303) reads out the sound announcement for instructing the customer to operate the cash settlement key 613 or the card settlement key 614 from the sound file 342 to inform the customer of the sound announcement with voice from the sound informing section 30 (ACT S55). At the same time, the control section 300 (operation informing module 303) displays the cash settlement key 613 or the card settlement key 614 on the display section 6 in a blinking manner. In this way, the control section 300 informs the customer of the positions of the cash settlement key 613 and the card settlement key 614. Then, the control section 300 sets the flag B stored in the announcement flag B section 3332 of the flag storage section 333 to "1" (ACT S56).

Next, the control section 300 determines whether or not the current position of the line of sight of the customer is coincident with the position (Xm2Yn2) of the cash settlement key 613 or the current position of the line of sight of the customer is coincident with the position (Xm3Yn3) of the card settlement key 614 again (ACT S57). If it is determined that a comparison result of either of the two cases indicates the coincidence (Yes in ACT S57), the control section 300 returns to the processing in ACT S43. If it is determined that the comparison results of both cases do not indicate the coincidence (No in ACT S57), the control section 300 determines whether or not the predetermined time elapses in a state in which the comparison results of both cases do not indicate the coincidence (ACT S58). If it is determined that the predetermined time does not elapse (No in ACT S58), the control section 300 returns to the processing in ACT S43. If it is determined that the predetermined time elapses (Yes in ACT S58), the control section 300 (support informing module 304) enables the light emitting section 22a of the display pole 22 to emit red light to display the display pole in red (ACT S59), and automatically requests the attendant to give the support. Then, the control section 300 sets the flag B stored in the announcement flag B section 3332 of the flag storage section 333 to "0" (ACT S60).

The attendant who sees the display pole 22 displayed in red supports the customer in the self-checkout POS terminal 1. In this case, the attendant supports the customer in operating the cash settlement key 613 or the card settlement key 614.

Next, the control section 300 determines whether or not the clear key (not shown) is operated by the attendant or the customer (ACT S61). The control section 300 waits for until the clear key is operated (No in ACT S61). If it is determined that the clear key is operated (Yes in ACT S61), the control section 300 returns to the processing in ACT S43.

In ACT S51, if it is determined that the flag B of the announcement flag B section 3332 is "1" (Yes in ACT S51), the control section 300 executes the processing in ACT S57 and the processing subsequent to ACT S57.

Figure 11:
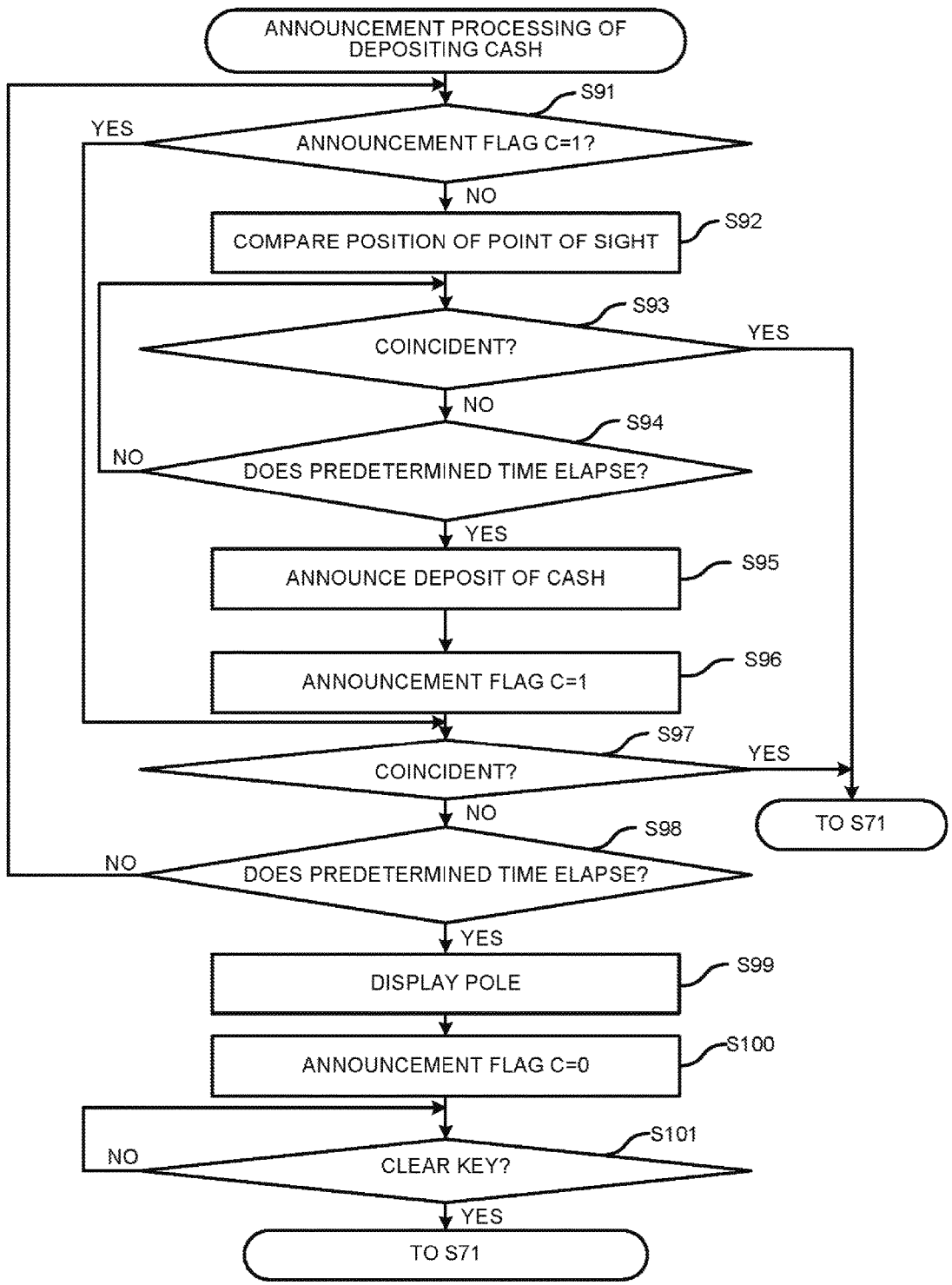
FIG. 11 is a flowchart illustrating the flow of the control processing of the settlement processing with cash by the self-checkout POS terminal.
Figure 12:
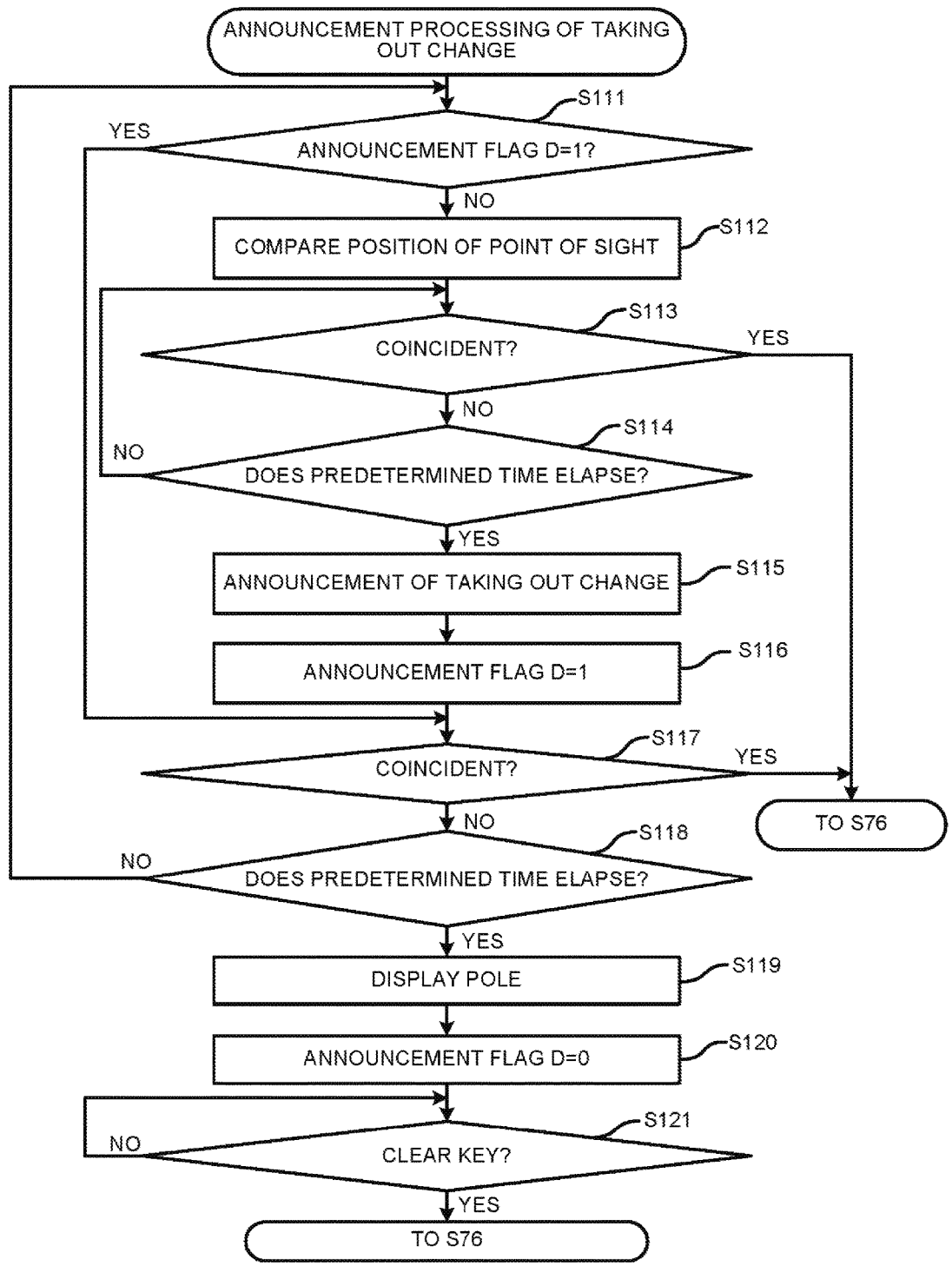
FIG. 12 is a flowchart illustrating the flow of the control processing of the settlement processing with cash by the self-checkout POS terminal.

Subsequently, the settlement processing with cash in ACT S44 is described with reference to FIG. 10~FIG. 12. First, the control section 300 determines whether or not cash is deposited into either or both of the bill depositing port 41 and the coin depositing port 43 (ACT S71). If cash is deposited, a sensor (not shown) detects the deposit of the cash, and the control section 300 determines that cash is deposited. If it is determined that cash is deposited (Yes in ACT S71), the control section 300 carries out the settlement processing with the cash (ACT S72). If it is determined that cash is not deposited (No in ACT S71), the control section 300 carries out an announcement processing for instructing the deposit of cash (ACT S73). Then, the control section 300 returns to the processing in ACT S71.

The announcement processing in ACT S73 is described with reference to FIG. 11. In FIG. 11, the control section 300 determines whether or not the flag C in the announcement flag C section 3333 of the flag storage section 333 is "1" (ACT S91). If the flag C of the announcement flag C section 3333 is "0" (No in ACT S91), in other words, in a case in which the sound announcement for instructing the customer to deposit cash (bills and coins) is not informed yet, the control section 300 compares the current position of the line of sight of the customer of which the storage is started in ACT S14 with a position (Xm4Yn4) of the bill depositing port 41 (ACT S92). Further, the control section 300 compares the current position of the line of sight of the customer with a position (Xm5Yn5) of the coin depositing port 43 (ACT S92). Then, the control section 300 (coincidence determining module 302) determines whether or not the current position of the line of sight of the customer is coincident with the position (Xm4Yn4) of the bill depositing port 41 or the current position of the line of sight of the customer is coincident with the position (Xm5Yn5) of the coin depositing port 43, which are compared in ACT S92 (ACT S93).

If it is determined that a comparison result of either of the two cases indicates the coincidence (Yes in ACT S93), the control section 300 returns to the processing in ACT S71. If it is determined that the comparison results of both cases do not indicate the coincidence (No in ACT S93), the control section 300 determines whether or not the predetermined time elapses in a state in which the comparison results of both cases do not indicate the coincidence (ACT S94). If it is determined that the predetermined time does not elapse (No in ACT S94), the control section 300 returns to the processing in ACT S93. If it is determined that the predetermined time elapses (Yes in ACT S94), the control section 300 (operation informing module 303) reads out the sound announcement for instructing the customer to deposit cash (bills and coins) from the sound file 342 to inform the customer of the sound announcement with voice from the sound informing section 30 (ACT S95). At the same time, the control section 300 enables the light emitting section 37 around the bill depositing port 41 and that around the coin depositing port 43 to emit light. In this way, the control section 300 informs the customer of the positions of the bill depositing port 41 and the coin depositing port 43. Then, the control section 300 sets the flag C stored in the announcement flag C section 3333 of the flag storage section 333 to "1" (ACT S96).

Next, the control section 300 determines whether or not the current position of the line of sight of the customer is coincident with the position (Xm4Yn4) of the bill depositing port 41 or the current position of the line of sight of the customer is coincident with the position (Xm5Yn5) of the coin depositing port 43 again (ACT S97). If it is determined that a comparison result of either of the two cases indicates the coincidence (Yes in ACT S97), the control section 300 returns to the processing in ACT S71. If it is determined that the comparison results of both cases do not indicate the coincidence (No in ACT S97), the control section 300 determines whether or not the predetermined time elapses in a state in which the comparison results of both cases do not indicate the coincidence (ACT S98). If it is determined that the predetermined time does not elapse (No in ACT S98), the control section 300 returns to the processing in ACT S43. If it is determined that the predetermined time elapses (Yes in ACT S98), the control section 300 (support informing module 304) enables the light emitting section 22a of the display pole 22 to emit the red light to display the display pole in red (ACT S99), and automatically requests the attendant to give the support. Then, the control section 300 sets the flag C stored in the announcement flag C section 3333 of the flag storage section 333 to "0" (ACT S100).

The attendant who sees the display pole 22 displayed in red supports the customer in the self-checkout POS terminal 1. In this case, the attendant supports the customer in depositing cash into the bill depositing port 41 and/or the coin depositing port 43.

Next, the control section 300 determines whether or not the clear key (not shown) is operated by the attendant or the customer (ACT S101). The control section 300 waits for until the clear key is operated (No in ACT S101). If it is determined that the clear key is operated (Yes in ACT S101), the control section 300 returns to the processing in ACT S71.

In ACT S91, if it is determined that the flag C of the announcement flag C section 3333 is "1" (Yes in ACT S91), the control section 300 executes the processing in ACT S97 and the processing subsequent to ACT S97.

Figure 10:
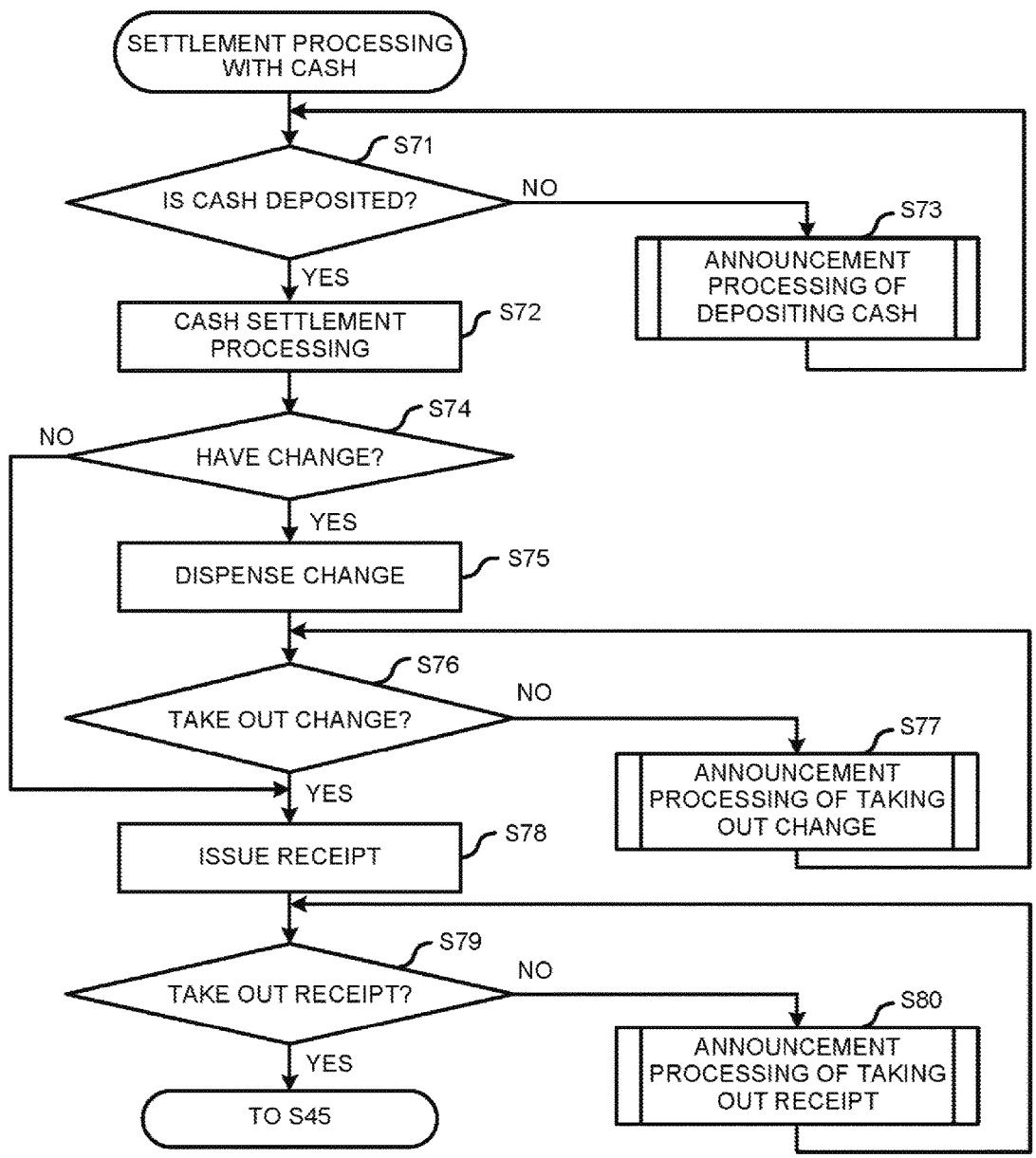
FIG. 10 is a flowchart illustrating the flow of a control processing of a settlement processing with cash by the self-checkout POS terminal.

Return to the description of FIG. 10. At the time when the settlement processing with cash in ACT S72 is carried out, the control section 300 determines presence/absence of change to be held over to the customer (ACT S74). If it is determined that there is change (Yes in ACT S74), the control section 300 sends change amount information, and controls the cash depositing/dispensing section 26 to dispense the change (ACT S75). In a case in which there is change of bills, the control section 300 dispenses the change of bills from the bill dispensing port 42. In a case in which there is change of coins, the control section 300 dispenses the change of coins from the coin dispensing port 44.

Then, the control section 300 determines whether or not the changes is dispensed from the bill dispensing port 42 and/or the coin dispensing port 44 (ACT S76). Sensors (not shown) for detecting presence/absence of the change are arranged in the bill dispensing port 42 and the coin dispensing port 44. In a case in which the sensor detects the change, the control section 300 determines that the change is not taken out. If it is determined by the control section 300 that the change is not taken out (No in ACT S76), the control section 300 executes an announcement processing for instructing the customer to take out the change (ACT S77). Then, the control section 300 returns to the processing in ACT S76. On the other hand, if it is determined that there is no change to be held over to the customer (No in ACT S74), the control section 300 carries out a processing in ACT S78 and processing subsequent to ACT S78.

The announcement processing of taking out the change is described with reference to FIG. 12. In FIG. 12, the control section 300 determines whether or not the flag D in the announcement flag D section 3334 of the flag storage section 333 is "1" (ACT S111). If the flag D of the announcement flag D section 3334 is "0" (No in ACT S111), in other words, in a case in which the sound announcement for instructing the customer to take out the change is not informed yet, the control section 300 compares the current position of the line of sight of the customer of which the storage is started in ACT S14 with a position (Xm6Yn6) of the bill dispensing port 42 (ACT S112). Further, the control section 300 compares the current position of the line of sight of the customer with a position (Xm7Yn7) of the coin dispensing port 44 (ACT S112). Then, the control section 300 (coincidence determining module 302) determines whether or not the current position of the line of sight of the customer is coincident with the position (Xm6Yn6) of the bill dispensing port 42 or the current position of the line of sight of the customer is coincident with the position (Xm7Yn7) of the coin dispensing port 44, which are compared in ACT S112 (ACT S113).

If it is determined that a comparison result of either of the two cases indicates the coincidence (Yes in ACT S113), the control section 300 returns to the processing in ACT S76. If it is determined that the comparison results of both cases do not indicate the coincidence (No in ACT S113), the control section 300 determines whether or not the predetermined time elapses in a state in which the comparison results of both cases do not indicate the coincidence (ACT S114). If it is determined that the predetermined time does not elapse (No in ACT S114), the control section 300 returns to the processing in ACT S113. If it is determined that the predetermined time elapses (Yes in ACT S114), the control section 300 (operation informing module 303) reads out the sound announcement for instructing the customer to take out the change from the sound file 342 to inform the customer of the sound announcement with voice from the sound informing section 30 (ACT S115). At the same time, the control section 300 enables the light emitting section 37 around the bill dispensing port 42 and that around the coin dispensing port 44 to emit light. In this way, the control section 300 informs the customer of the positions of the bill dispensing port 42 and the coin dispensing port 44. Then, the control section 300 sets the flag D stored in the announcement flag D section 3334 of the flag storage section 333 to "1" (ACT S116).

Next, the control section 300 determines whether or not the current position of the line of sight of the customer is coincident with the position (Xm6Yn6) of the bill dispensing port 42 or the current position of the line of sight of the customer is coincident with the position (Xm7Yn7) of the coin dispensing port 44 again (ACT S117). If it is determined that a comparison result of either of the two cases indicates the coincidence (Yes in ACT S117), the control section 300 returns to the processing in ACT S76. If it is determined that the comparison results of both cases do not indicate the coincidence (No in ACT S117), the control section 300 determines whether or not the predetermined time elapses in a state in which the comparison results of both cases do not indicate the coincidence (ACT S118). If it is determined that the predetermined time does not elapse (No in ACT S118), the control section 300 returns to the processing in ACT S111. If it is determined that the predetermined time elapses (Yes in ACT S118), the control section 300 (support informing module 304) enables the light emitting section 22a of the display pole 22 to emit the red light to display the display pole in red (ACT S9 ACT S119), and automatically requests the attendant to give the support. Then, the control section 300 sets the flag D stored in the announcement flag D section 3334 of the flag storage section 333 to "0" (ACT S120).

The attendant who sees the display pole 22 displayed in red supports the customer in the self-checkout POS terminal 1. In this case, the attendant supports the customer in taking out the change from the bill dispensing port 42 and/or the coin dispensing port 44.

Next, the control section 300 determines whether or not the clear key (not shown) is operated by the attendant or the customer (ACT S121). The control section 300 waits for until the clear key is operated (No in ACT S121). If it is determined that the clear key is operated (Yes in ACT S121), the control section 300 returns to the processing in ACT S76.

In ACT S111, if it is determined that the flag D of the announcement flag D section 3334 is "1" (Yes in ACT S111), the control section 300 executes the processing in ACT S117 and the processing subsequent to ACT S117.

Return to the description of FIG. 10. If it is determined that the change is taken out by the customer (Yes in ACT S76), the control section 300 issues a receipt on which the sales information to which the transaction processing is carried out in a cash transaction with the customer is printed by the printing section 9 from the receipt issuing port 9a (ACT S78). Then, the control section 300 determines whether or not the receipt is taken out by the customer from the receipt issuing port 9a (ACT S79). If it is determined that the receipt is taken out (Yes in ACT S79), the control section 300 executes the processing in ACT S45; contrarily, if it is determined that the receipt is not taken out (No in ACT S79), the control section 300 executes an announcement processing of taking out the receipt (ACT S80). Then, the control section 300 returns to the processing in ACT S79. A sensor (not shown) for determining presence/absence of the issued receipt in the receipt issuing port 9a is arranged. In a case in which the sensor detects the receipt, the control section 300 determines that the receipt is not taken out by the customer.

Figure 13:
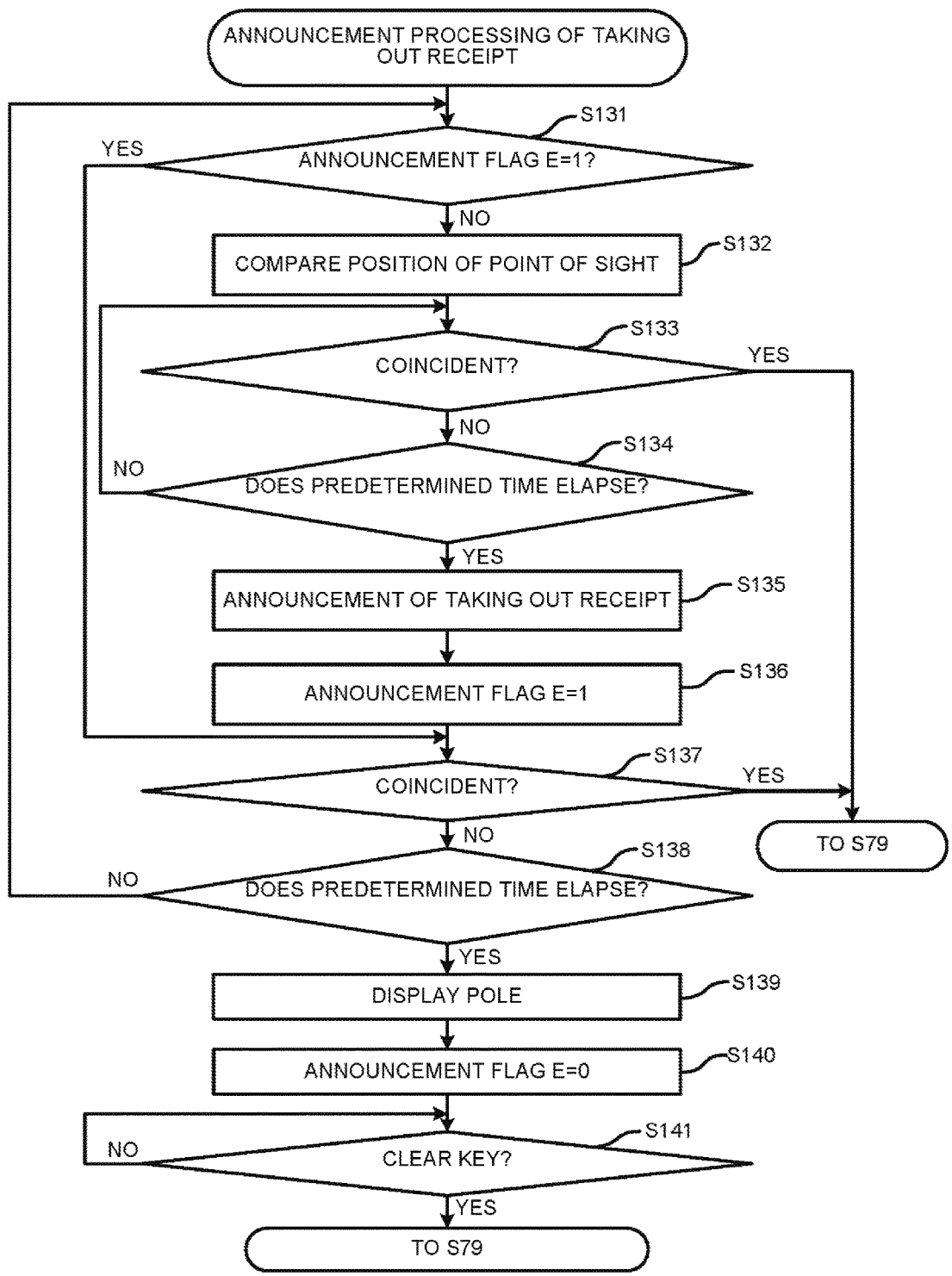
FIG. 13 is a flowchart illustrating the flow of the control processing of the settlement processing with cash by the self-checkout POS terminal.

The announcement processing of taking out the receipt is described with reference to FIG. 13. In FIG. 13, the control section 300 determines whether or not the flag E of the announcement flag E section 3335 in the flag storage section 333 is "1" (ACT S131). If the flag E of the announcement flag E section 3335 is "0" (No in ACT S131), in other words, in a case in which the sound announcement for instructing the customer who pays with cash to take out the receipt is not informed yet, the control section 300 compares the current position of the line of sight of the customer of which the storage is started in ACT S14 with a position (Xm8Yn8) of the receipt issuing port 9*a* (ACT S132). Then, the control section 300 (coincidence determining module 302) determines whether or not the current position of the line of sight of the customer is coincident with the position (Xm8Yn8) of the receipt issuing port 9*a*, which are compared in ACT S132 (ACT S133).

If it is determined that a comparison result indicates the coincidence (Yes in ACT S133), the control section 300 returns to the processing in ACT S79. If it is determined that the comparison result does not indicate the coincidence (No in ACT S133), the control section 300 determines whether or not the predetermined time elapses in a state in which the comparison result does not indicate the coincidence (ACT S134). If it is determined that the predetermined time does not elapse (No in ACT S134), the control section 300 returns to the processing in ACT S133. If it is determined that the predetermined time elapses (Yes in ACT S134), the control section 300 (operation informing module 303) reads out the sound announcement for instructing the customer who pays with cash to take out the receipt from the sound file 342 to inform the customer of the sound announcement with voice from the sound informing section 30 (ACT S135). At the same time, the control section 300 enables the light emitting section 37 around the receipt issuing port 9*a* to emit light. In this way, the control section 300 informs the customer of the position of the receipt issuing port 9*a*. Then, the control section 300 sets the flag E stored in the announcement flag E section 3335 of the flag storage section 333 to "1" (ACT S136).

Next, the control section 300 determines whether or not the current position of the line of sight of the customer is coincident with the position (Xm8Yn8) of the receipt issuing port 9*a* again (ACT S137). If it is determined that comparison result indicates the coincidence (Yes in ACT S137), the control section 300 returns to the processing in ACT S79. If it is determined that the comparison result does not indicate the coincidence (No in ACT S137), the control section 300 determines whether or not the predetermined time elapses in a state in which the comparison result does not indicate the coincidence (ACT S138). If it is determined that the predetermined time does not elapse (No in ACT S138), the control section 300 returns to the processing in ACT S131. If it is determined that the predetermined time elapses (Yes in ACT S138), the control section 300 (support informing module 304) enables the light emitting section 22*a* of the display pole 22 to emit the red light to display the display pole in red (ACT S139), and automatically requests the attendant to give the support. Then, the control section 300 sets the flag E stored in the announcement flag E section 3335 of the flag storage section 333 to "0" (ACT S140).

The attendant who sees the display pole 22 displayed in red supports the customer in the self-checkout POS terminal 1. In this case, the attendant supports the customer in taking out the receipt from the receipt issuing port 9*a*.

Next, the control section 300 determines whether or not the clear key (not shown) is operated by the attendant or the customer (ACT S141). The control section 300 waits for until the clear key is operated (No in ACT S141). If it is determined that the clear key is operated (Yes in ACT S141), the control section 300 returns to the processing in ACT S79.

In ACT S131, if it is determined that the flag E of the announcement flag E section 3335 is "1" (Yes in ACT S131), the control section 300 executes the processing in ACT S137 and the processing subsequent to ACT S137.

From here, the settlement processing with card in ACT S47 is described with reference to FIG. 14–FIG. 17. First, the control section 300 determines whether or not the card is inserted into the card insertion port 8*a* of the card reader/writer 8 (ACT S151). If the card is inserted, a sensor (not shown) arranged in the card insertion port 8*a* detects the insertion of the card, and the control section 300 determines that the card is inserted. If it is determined that the card is inserted (Yes in ACT S151), the control section 300 executes the settlement processing with the card (ACT S152). If it is determined that the card is not inserted (No in ACT S151), the control section 300 executes an announcement processing for instructing the customer to insert the card (ACT S153). Then, the control section 300 returns to the processing in ACT S151.

Figure 15:
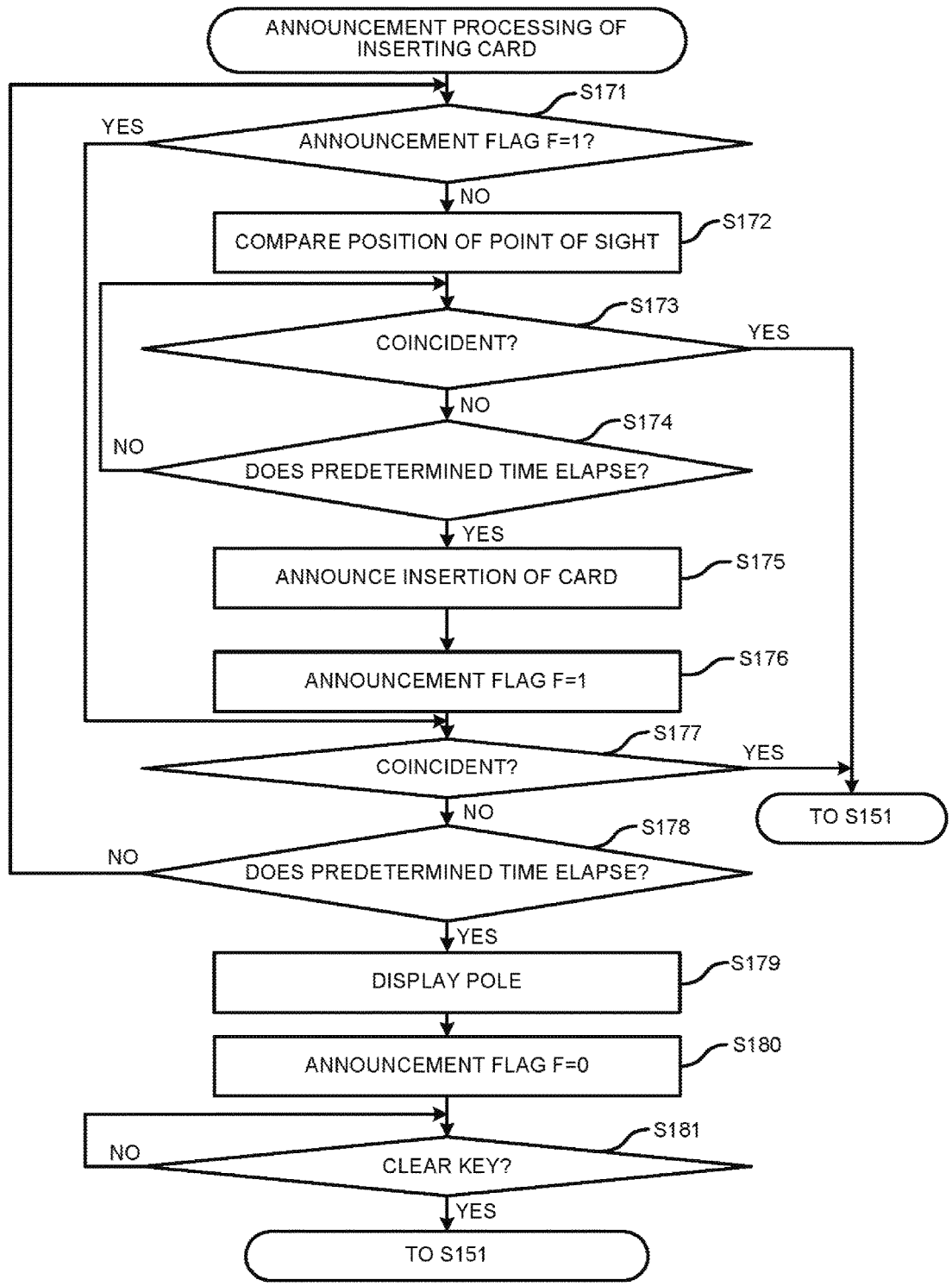
FIG. 15 is a flowchart illustrating the flow of the control processing of the settlement processing with card by the self-checkout POS terminal.

The announcement processing in ACT S153 is described with reference to FIG. 15. In FIG. 15, the control section 300 determines whether or not the flag F in the announcement flag F section 3336 of the flag storage section 333 is "1" (ACT S171). If the flag F of the announcement flag F section 3336 is "0" (No in ACT S171), in other words, in a case in which the sound announcement for instructing the customer to insert the card is not informed yet, the control section 300 compares the current position of the line of sight of the customer of which the storage is started in ACT S14 with a position (Xm9Yn9) of the card issuing port 8*a* arranged in the card reader/writer 8 (ACT S172). Then, the control section 300 (coincidence determining module 302) determines whether or not the current position of the line of sight of the customer is coincident with the position (Xm9Yn9) of the card issuing port 8*a*, which are compared in ACT S172 (ACT S173).

If it is determined that comparison result indicates the coincidence (Yes in ACT S173), the control section 300 returns to the processing in ACT S51. If it is determined that the comparison result does not indicate the coincidence (No in ACT S173), the control section 300 determines whether or not the predetermined time elapses in a state in which the comparison result does not indicate the coincidence (ACT S174). If it is determined that the predetermined time does not elapse (No in ACT S174), the control section 300 returns to the processing in ACT S173. If it is determined that the predetermined time elapses (Yes in ACT S174), the control section 300 (operation informing module 303) reads out the sound announcement for instructing the customer to insert the card from the sound file 342 to inform the customer of the sound announcement with voice from the sound informing section 30 (ACT S175). At the same time, the control section 300 enables the light emitting section 37 around the card insertion port 8*a* to emit light. In this way, the control section 300 informs the customer of the position of the card insertion port 8*a*. Then, the control section 300 sets the flag F stored in the announcement flag F section 3336 of the flag storage section 333 to "1" (ACT S176).

Next, the control section 300 determines whether or not the current position of the line of sight of the customer is coincident with the position (Xm9Yn9) of the card insertion port 8*a* again (ACT S177). If it is determined that comparison result indicates the coincidence (Yes in ACT S177), the control section 300 returns to the processing in ACT S151. If it is determined that the comparison result does not indicate the coincidence (No in ACT S177), the control section 300 determines whether or not the predetermined time elapses in a state in which the comparison result of the case does not indicate the coincidence (ACT S178). If it is determined that the predetermined time does not elapse (No in ACT S178), the control section 300 returns to the processing in ACT S171. If it is determined that the predetermined time elapses (Yes in ACT S178), the control section 300 (support informing module 304) enables the light emitting section 22a of the display pole 22 to emit the red light to display the display pole in red (ACT S179), and automatically requests the attendant to give the support. Then, the control section 300 sets the flag F stored in the announcement flag F section 3336 of the flag storage section 333 to "0" (ACT S180).

The attendant who sees the display pole 22 displayed in red supports the customer in the self-checkout POS terminal 1. In this case, the attendant supports the customer in inserting the card into the card insertion port 8a.

Next, the control section 300 determines whether or not the clear key (not shown) is operated by the attendant or the customer (ACT S181). The control section 300 waits for until the clear key is operated (No in ACT S181). If it is determined that the clear key is operated (Yes in ACT S181), the control section 300 returns to the processing in ACT S151.

In ACT S171, if it is determined that the flag F of the announcement flag F section 3336 is "1" (Yes in ACT S171), the control section 300 executes the processing in ACT S177 and the processing subsequent to ACT S177.

Figure 14:
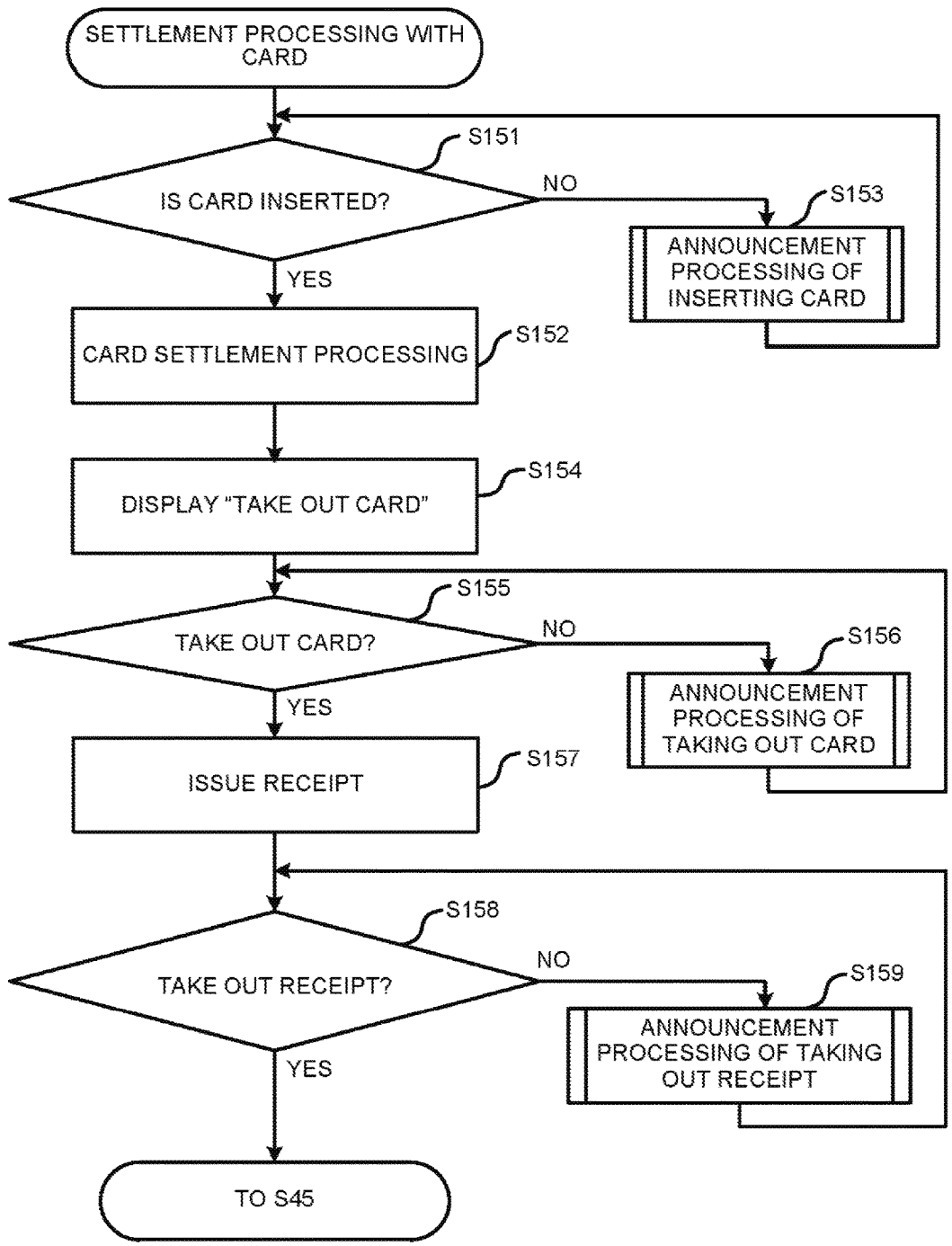
FIG. 14 is a flowchart illustrating the flow of a control processing of a settlement processing with a card by the self-checkout POS terminal.

Return to the description of FIG. 14. After executing the settlement processing with the card, the control section 300 displays a message for instructing the customer to take out the card on the display section 6 (ACT S154). Then, the control section 300 determines whether or not the card is taken out by the customer from the card insertion port 8a (ACT S155). In a case in which the sensor arranged in the vicinity of the card insertion port 8a detects the card, the control section 300 determines that the card is not taken out. If it is determined by the control section 300 that the card is not taken out (No in ACT S155), the control section 300 executes an announcement processing for instructing the customer to take out the card (ACT S156). Then, the control section 300 returns to the processing in ACT S155.

Figure 16:
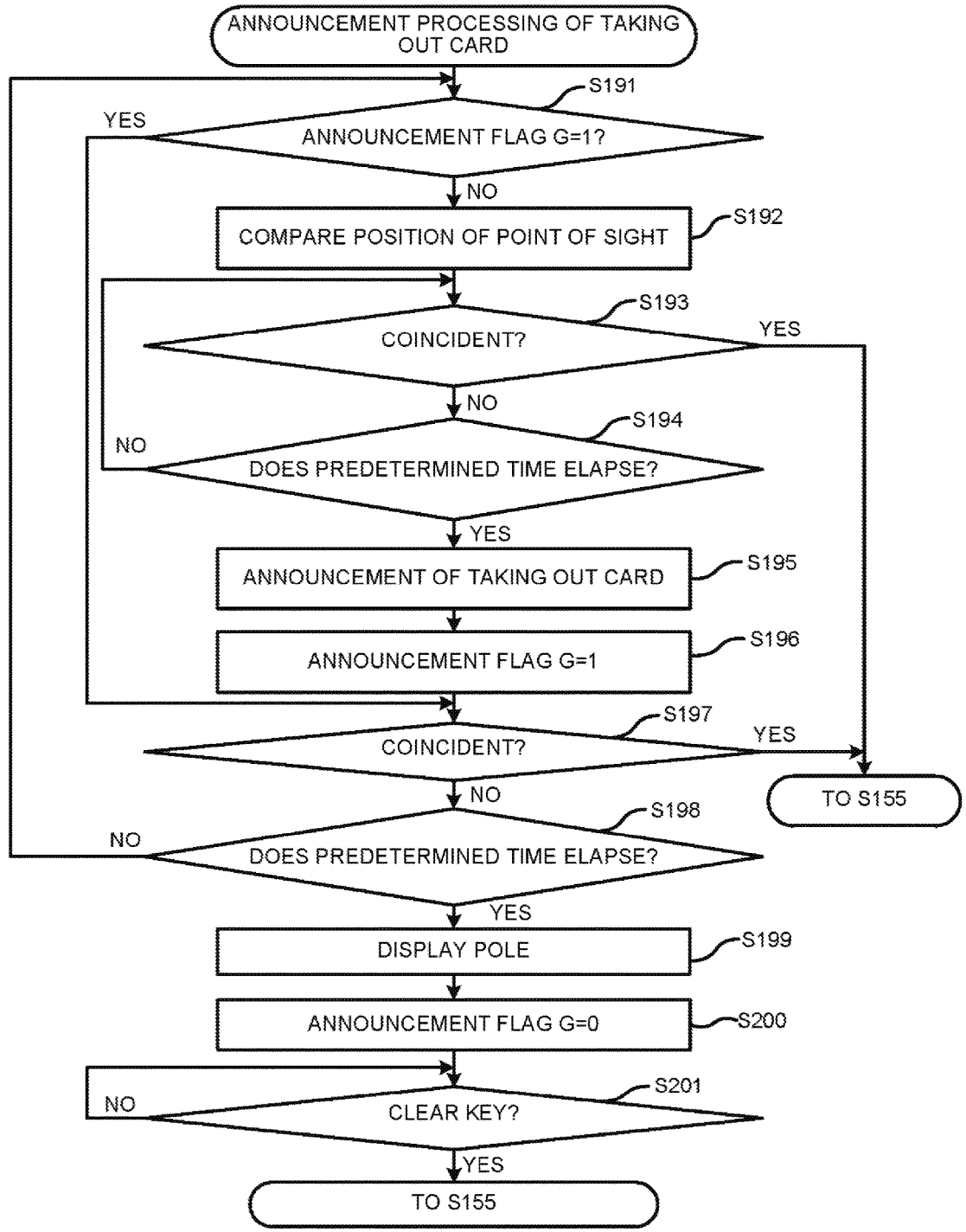
FIG. 16 is a flowchart illustrating the flow of the control processing of the settlement processing with card by the self-checkout POS terminal.

The announcement processing for instructing the customer to take out the card is described with reference to FIG. 16. In FIG. 16, the control section 300 determines whether or not the flag G in the announcement flag G section 3337 of the flag storage section 333 is "1" (ACT S191). If the flag G of the announcement flag G section 3337 is "0" (No in ACT S191), in other words, in a case in which the sound announcement for instructing the customer to take out the card is not informed yet, the control section 300 compares the current position of the line of sight of the customer of which the storage is started in ACT S14 with the position (Xm9Yn9) of the card issuing port 8a (ACT S192). Then, the control section 300 (coincidence determining module 302) determines whether or not the current position of the line of sight of the customer is coincident with the position (Xm9Yn9) of the card issuing port 8a, which is compared in ACT S192 (ACT S193).

If it is determined that a comparison result indicates the coincidence (Yes in ACT S193), the control section 300 returns to the processing in ACT S155. If it is determined that the comparison result does not indicate the coincidence (No in ACT S193), the control section 300 determines whether or not the predetermined time elapses in a state in which the comparison result does not indicate the coincidence (ACT S194). If it is determined that the predetermined time does not elapse (No in ACT S194), the control section 300 returns to the processing in ACT S193. If it is determined that the predetermined time elapses (Yes in ACT S194), the control section 300 (operation informing module 303) reads out the sound announcement for instructing the customer to take out the card from the sound file 342 to inform the customer of the sound announcement with voice from the sound informing section 30 (ACT S195). At the same time, the control section 300 enables the light emitting section 37 around the card insertion port 8a to emit light. In this way, the control section 300 informs the customer of the position of the card insertion port 8a. Then, the control section 300 sets the flag G stored in the announcement flag G section 3337 of the flag storage section 333 to "1" (ACT S196).

Next, the control section 300 determines whether or not the current position of the line of sight of the customer is coincident with the position (Xm9Yn9) of the card insertion port 8a again (ACT S197). If it is determined that a comparison result indicates the coincidence (Yes in ACT S197), the control section 300 returns to the processing in ACT S155. If it is determined that the comparison result does not indicate the coincidence (No in ACT S197), the control section 300 determines whether or not the predetermined time elapses in a state in which the comparison result does not indicate the coincidence (ACT S198). If it is determined that the predetermined time does not elapse (No in ACT S198), the control section 300 returns to the processing in ACT S191. If it is determined that the predetermined time elapses (Yes in ACT S198), the control section 300 (support informing module 304) enables the light emitting section 22a of the display pole 22 to emit the red light to display the display pole in red (ACT S199), and automatically requests the attendant to give the support. Then, the control section 300 sets the flag G stored in the announcement flag G section 3337 of the flag storage section 333 to "0" (ACT S200).

The attendant who sees the display pole 22 displayed in red supports the customer in the self-checkout POS terminal 1. In this case, the attendant supports the customer in taking out the card from the card insertion port 8a.

Next, the control section 300 determines whether or not the clear key (not shown) is operated by the attendant or the customer (ACT S201). The control section 300 waits for until the clear key is operated (No in ACT S201). If it is determined that the clear key is operated (Yes in ACT S201), the control section 300 returns to the processing in ACT S155.

In ACT S191, if it is determined that the flag G of the announcement flag G section 3337 is "1" (Yes in ACT S191), the control section 300 executes the processing in ACT S197 and the processing subsequent to ACT S197.

Return to the description of FIG. 14. If it is determined that the card is taken out by the customer (Yes in ACT S155), the control section 300 issues a receipt on which the sales information in which the transaction processing is carried out in a card transaction with the customer is printed by the printing section 9 from the receipt issuing port 9a (ACT S157). Then, the control section 300 determines whether or not the receipt is taken out by the customer from the receipt issuing port 9a (ACT S158). If it is determined that the receipt is taken out (Yes in ACT S158), the control section 300 executes the processing in ACT S45; contrarily, if it is determined that the receipt is not taken out (No in ACT S158), the control section 300 executes an announcement processing of taking out the receipt (ACT S1 ACT S159). Then, the control section 300 returns to the processing in ACT S158. A sensor (not shown) for determining presence/absence of the issued receipt in the receipt issuing port 9a is arranged, and in a case in which the sensor detects the receipt, the control section 300 determines that the receipt is not taken out by the customer.

Figure 17:
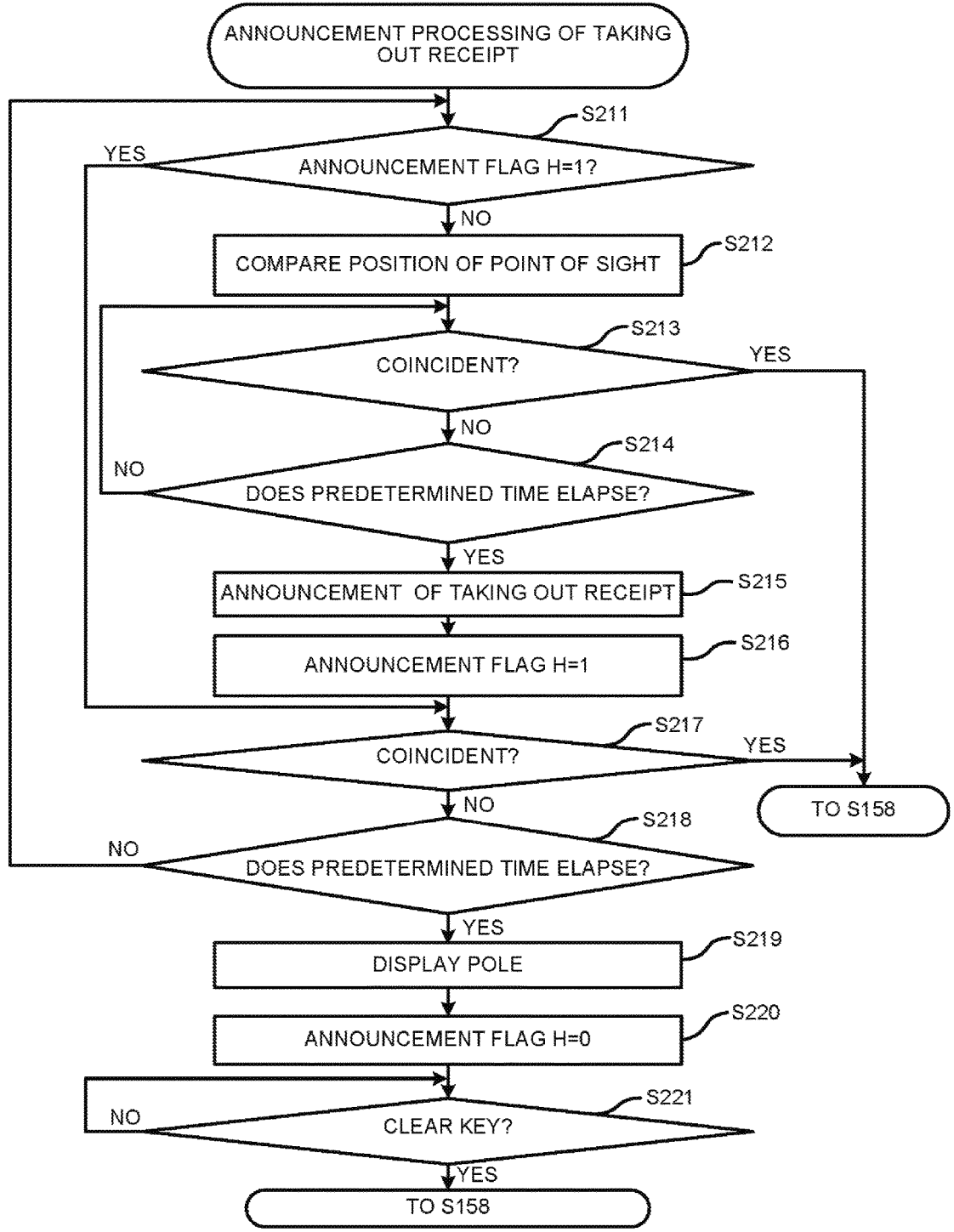
FIG. 17 is a flowchart illustrating the flow of the control processing of the settlement processing with card by the self-checkout POS terminal.

The announcement processing of taking out the receipt at the time of the settlement processing with card is described with reference to FIG. 17. In FIG. 17, the control section 300 determines whether or not the flag H in the announcement flag H section 3338 of the flag storage section 333 is "1" (ACT S211). If the flag H of the announcement flag H section 3338 is "0" (No in ACT S211), in other words, in a case in which the sound announcement for instructing the customer to take out the card is not informed yet, the control section 300 compares the current position of the line of sight of the customer of which the storage is started in ACT S14 with the position (Xm8Yn8) of the receipt issuing port 9a (ACT S212). Then, the control section 300 (coincidence determining module 302) determines whether or not the current position of the line of sight of the customer is coincident with the position (Xm8Yn8) of the receipt issuing port 9a, which is compared in ACT S212 (ACT S213).

If it is determined that a comparison result indicates the coincidence (Yes in ACT S213), the control section 300 returns to the processing in ACT S158. If it is determined that the comparison result does not indicate the coincidence (No in ACT S213), the control section 300 determines whether or not the predetermined time elapses in a state in which the comparison result does not indicate the coincidence (ACT S214). If it is determined that the predetermined time does not elapse (No in ACT S214), the control section 300 returns to the processing in ACT S213. If it is determined that the predetermined time elapses (Yes in ACT S214), the control section 300 (operation informing module 303) reads out the sound announcement for instructing the customer to take out the receipt from the sound file 342 to inform the customer of the sound announcement with voice from the sound informing section 30 (ACT S215). At the same time, the control section 300 enables the light emitting section 37 around the receipt issuing port 9a to emit light. In this way, the control section 300 informs the customer of the position of the receipt issuing port 9a. Then, the control section 300 sets the flag H stored in the announcement flag H section 3338 of the flag storage section 333 to "1" (ACT S216).

Next, the control section 300 determines whether or not the current position of the line of sight of the customer is coincident with the position (Xm8Yn8) of the receipt issuing port 9a again (ACT S217). If it is determined that a comparison result indicates the coincidence (Yes in ACT S217), the control section 300 returns to the processing in ACT S158. If it is determined that the comparison result does not indicate the coincidence (No in ACT S217), the control section 300 determines whether or not the predetermined time elapses in a state in which the comparison result does not indicate the coincidence (ACT S218). If it is determined that the predetermined time does not elapse (No in ACT S218), the control section 300 returns to the processing in ACT S211. If it is determined that the predetermined time elapses (Yes in ACT S218), the control section 300 (support informing module 304) enables the light emitting section 22a of the display pole 22 to emit the red light to display the display pole in red (ACT S219), and automatically requests the attendant to give the support. Then, the control section 300 sets the flag H stored in the announcement flag H section 3337 of the flag storage section 333 to "0" (ACT S220).

The attendant who sees the display pole 22 displayed in red supports the customer in the self-checkout POS terminal 1. In this case, the attendant supports the customer in taking out the receipt from the receipt issuing port 9a.

Next, the control section 300 determines whether or not the clear key (not shown) is operated by the attendant or the customer (ACT S221). The control section 300 waits for until the clear key is operated (No in ACT S221). If it is determined that the clear key is operated (Yes in ACT S221), the control section 300 returns to the processing in ACT S158.

In ACT S211, if it is determined that the flag H of the announcement flag H section 3338 is "1" (Yes in ACT S211), the control section 300 executes the processing in ACT S217 and the processing subsequent to ACT S217.

According to such an embodiment described above, in a case in which the position of the line of sight of the customer tracked by the line of sight tracking section 27 is not coincident with the position of the operation section 38, the self-checkout POS terminal 1 informs the content of operation to be carried out and location. In this way, even if the customer hesitates in the operation, the customer can be properly supported. Further, in a case in which the self-checkout POS terminal 1 detects that the customer hesitates in the operation for a certain time, the self-checkout POS terminal 1 automatically informs the attendant of the case, and thus, the customer is unnecessary to call the attendant, and the attendant can also immediately deal with such trouble.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiment, the types of the settlement methods set two methods including the cash settlement and the card settlement; however, the settlement method may be another settlement method other than the cash settlement and the card settlement. Further, it may be possible that various types of settlement methods including other types of settlement methods in addition to the above-described two settlement methods are applied.

In the embodiment, the self-checkout POS terminal 1 operated by the customer is described as the sales data processing apparatus; however, the sales data processing apparatus may be a POS terminal operated by a full-time operator.

Further, in the embodiment, the commodity is described as the sales object; however, the sales object may be, for example, a service other than the commodity.

What is claimed is:
1. A sales data processing apparatus, comprising:
a display section;
a first light emitting section above the display section;
an operation section;
a line of sight position storage module configured to store information related to a position of a line of sight of an operator when the operator operates the operation section;
a line of sight measurement device configured to measure a position of the line of sight of the operator, the line of sight measurement device being arranged at a lower part of the display section;

an operation informing module configured to inform information for instructing an operation of the operation section to be operated next, when a predetermined time elapses in a state in which the position of the line of sight measured by the line of sight measurement device is not coincident with a position of the line of sight on the operation section to be operated next by the operator; and a light emission control module configured to cause the first light emitting section to emit light when a certain time further elapses, in the state in which the position of the line of sight measured by the line of sight measurement device is not coincident with the position of the line of sight on the operation section to be operated next, after the operation informing module informs the information for instructing the operation of the operation section to be operated next.

2. The sales data processing apparatus according to claim 1, wherein
the operation informing module informs the operation section to be operated next by outputting voice.

3. The sales data processing apparatus according to claim 1, further comprising:
a second light emitting section arranged nearby the operation section to be operated next, wherein
the operation informing module informs the operation section to be operated next by causing the second light emitting section to emit light or blink.

4. The sales data processing apparatus according to claim 1, wherein
the operation section includes an operation key to receive an operation through a touch panel on the display section, the operation key being the operation section to be operated next, and
the operation informing module informs the operation section to be operated next by displaying the operation key in a blinking manner.

5. The sales data processing apparatus according to claim 1, further comprising:
a start key for starting an operation related to sales registration of a commodity; and
a calibration module configured to execute calibration of the position of the line of sight of the operator when the operator operates the operation section by using the position of the line of sight measured by the the line of sight measurement device when the operator operates the start key.

6. A method for instructing an operation on an operation section to be operated next by an operator in a sales data processing apparatus which has a display section, a first light emitting section above the display section, the operation section, and a line of sight measurement device that measures a position of a line of sight of the operator, the line of sight measurement device being arranged at a lower part of the display section, the method including:
storing information related to the position of the line of sight of the operator when the operator operates the operation section;
informing information for instructing the operation of the operation section to be operated next, when a predetermined time elapses in a state in which the position of the line of sight measured by the line of sight measurement device is not coincident with a position of the line of sight on the operation section to be operated next by the operator; and
causing the first light emitting section to emit light when a certain time further elapses, in the state in which the position of the line of sight measured by the line of sight measurement device is not coincident with the position of the line of sight on the operation section to be operated next, after the informing the information for instructing the operation of the operation section to be operated next.

* * * * *